(12) United States Patent
Underwood

(10) Patent No.: US 10,405,676 B1
(45) Date of Patent: Sep. 10, 2019

(54) ARTICLE SUPPORTING ASSEMBLIES AND METHODS

(71) Applicant: Susan Evans Underwood, Monroe, LA (US)

(72) Inventor: Susan Evans Underwood, Monroe, LA (US)

(*) Notice: Subject to any disclaimer, the term of this patent is extended or adjusted under 35 U.S.C. 154(b) by 0 days.

(21) Appl. No.: 15/592,416

(22) Filed: May 11, 2017

Related U.S. Application Data

(60) Provisional application No. 62/337,078, filed on May 16, 2016.

(51) Int. Cl.
| | | |
|---|---|---|
| *A47F 5/08* | (2006.01) | |
| *F16B 45/00* | (2006.01) | |
| *F16B 1/00* | (2006.01) | |
| *A47F 5/06* | (2006.01) | |

(52) U.S. Cl.
CPC .............. *A47F 5/0846* (2013.01); *A47F 5/06* (2013.01); *F16B 1/00* (2013.01); *F16B 45/00* (2013.01); *F16B 2001/0035* (2013.01)

(58) Field of Classification Search
CPC ........ A47F 5/06; A47F 5/0846; A47F 5/0815; A47F 5/0823; A47F 5/083; A47F 5/0876; A47F 5/0884; F16B 1/00; F16B 45/00; F16B 2001/0035
See application file for complete search history.

(56) References Cited

U.S. PATENT DOCUMENTS

| | | | |
|---|---|---|---|
| 698,272 A | | 4/1902 | Glover |
| 1,140,940 A | * | 5/1915 | Bales ................. A47B 57/42 |
| | | | 211/87.01 |
| 2,928,512 A | * | 3/1960 | Slater .................. A47B 57/565 |
| | | | 248/243 |
| 3,179,367 A | * | 4/1965 | Rapata .................. A47B 57/52 |
| | | | 248/222.52 |
| 3,255,987 A | | 6/1966 | Gatch |
| 3,310,271 A | | 3/1967 | King |
| 3,443,783 A | | 5/1969 | Fisher |
| 3,476,344 A | * | 11/1969 | Pace ...................... E04F 13/10 |
| | | | 248/216.1 |
| 3,880,390 A | * | 4/1975 | Niven ................... A47F 5/0815 |
| | | | 248/220.43 |

(Continued)

*Primary Examiner* — Patrick D Hawn
(74) *Attorney, Agent, or Firm* — R. Keith Harrison

(57) ABSTRACT

An article supporting assembly includes at least one assembly base having a base panel and at least one elongated, generally vertical mount slot in the base panel. The mount slot has a pair of spaced-apart slot edges. At least one article support device is detachably carried by the assembly base. The at least one article support device includes at least one support device base positional between a release position and a locked position within the mount slot. A locking mechanism including a locking cam is provided on the support device base. The locking cam has a pair of opposite cam lock surfaces engaging the slot edges, respectively, of the mount slot in the locked position of the support device base and disengaging the slot edges, respectively, of the, mount slot in the release position of the support device base. At least one article support element for supporting at least one article such as clothing, a cell phone or a cup is supported by the support device base. Article supporting methods are also disclosed.

20 Claims, 38 Drawing Sheets

(56) References Cited

U.S. PATENT DOCUMENTS

| | | | | |
|---|---|---|---|---|
| 3,910,536 A | * | 10/1975 | Sharp | H02B 1/202 174/138 D |
| 3,917,202 A | * | 11/1975 | Reinwall, Jr. | H01R 9/26 174/72 A |
| 3,944,176 A | * | 3/1976 | Danko | H04Q 1/142 248/68.1 |
| 4,035,097 A | * | 7/1977 | Bachand | F16B 12/32 403/348 |
| 4,174,042 A | * | 11/1979 | Fair | E05B 73/00 211/64 |
| 4,212,445 A | * | 7/1980 | Hagen | F16B 12/34 248/222.52 |
| 4,635,801 A | | 1/1987 | Oren | |
| 4,805,784 A | | 2/1989 | Solheim et al. | |
| 4,826,022 A | | 5/1989 | Duarte | |
| 4,860,905 A | * | 8/1989 | Schott | A47F 5/0823 211/59.1 |
| 4,927,020 A | * | 5/1990 | Randy | B25B 13/56 206/378 |
| 5,154,385 A | * | 10/1992 | Lindberg | A47B 57/562 248/225.11 |
| 5,163,567 A | * | 11/1992 | Betts, Sr. | A47F 5/0815 211/59.1 |
| 5,412,912 A | | 5/1995 | Alves | |
| 5,503,276 A | * | 4/1996 | Pierce | A47F 5/0807 211/59.1 |
| 5,531,415 A | * | 7/1996 | Kallemeyn | A47F 5/0815 211/59.1 |
| 5,898,134 A | * | 4/1999 | Fallin | H02G 3/26 174/135 |
| 5,944,203 A | | 8/1999 | Vlah et al. | |
| 6,131,866 A | | 10/2000 | Kesinger | |
| 6,443,316 B1 | * | 9/2002 | Mao | A47F 5/0807 211/41.3 |
| 6,591,995 B1 | * | 7/2003 | Grove | A47F 5/0815 211/87.01 |
| 6,644,483 B1 | | 11/2003 | Lai | |
| 6,766,990 B1 | * | 7/2004 | Hileman | E06C 7/143 182/129 |
| D539,563 S | * | 4/2007 | Grosfillex | D6/682.6 |
| 7,204,375 B2 | | 4/2007 | Paiste et al. | |
| 7,353,957 B2 | * | 4/2008 | Winig | A47F 5/0815 211/59.1 |
| 8,459,472 B2 | * | 6/2013 | Hofman | A47F 5/0815 211/106.01 |
| 8,522,986 B2 | | 9/2013 | Kitchen | |
| 9,149,115 B2 | * | 10/2015 | Kasza | A47F 5/0846 |
| 9,565,933 B2 | * | 2/2017 | Kasza | A47F 5/0846 |
| D812,936 S | * | 3/2018 | Bruegmann | G09F 7/18 D6/672 |
| 2005/0072746 A1 | * | 4/2005 | O'Brien | A47F 5/0823 211/59.1 |
| 2006/0124812 A1 | | 6/2006 | Berardi | |
| 2007/0056921 A1 | | 3/2007 | Lo | |
| 2010/0132268 A1 | | 6/2010 | Vardaro | |
| 2011/0132853 A1 | * | 6/2011 | Drobot | A47B 57/562 211/42 |
| 2012/0085721 A1 | * | 4/2012 | Michael | A47B 57/562 211/103 |

\* cited by examiner

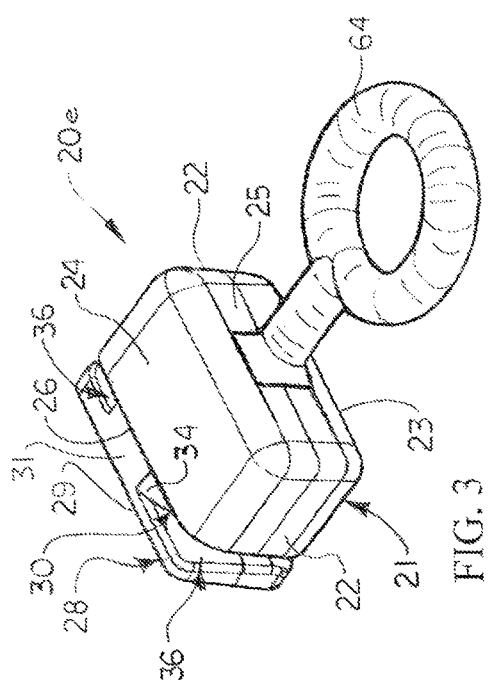
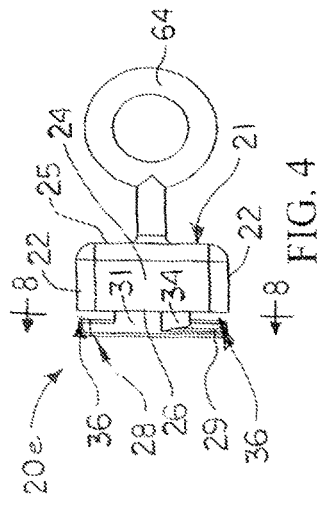
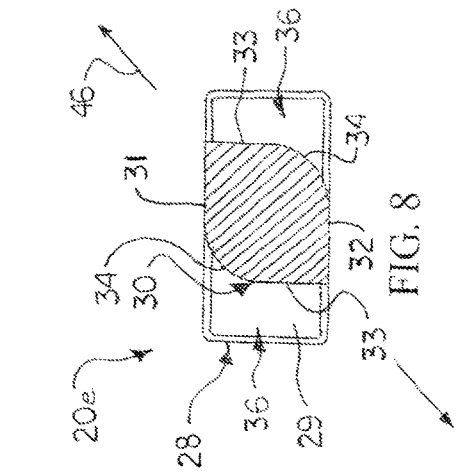
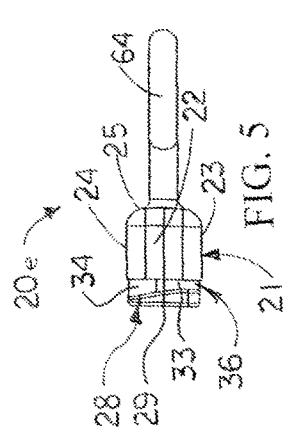
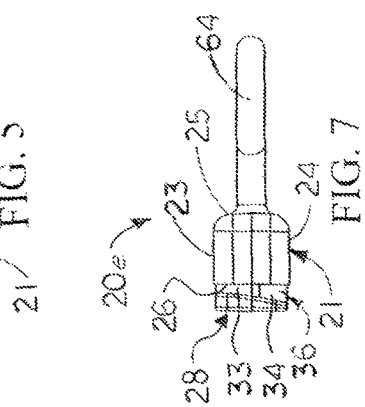
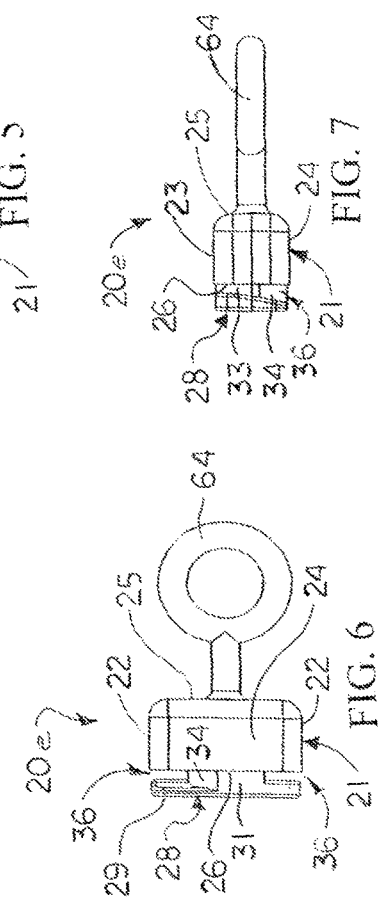

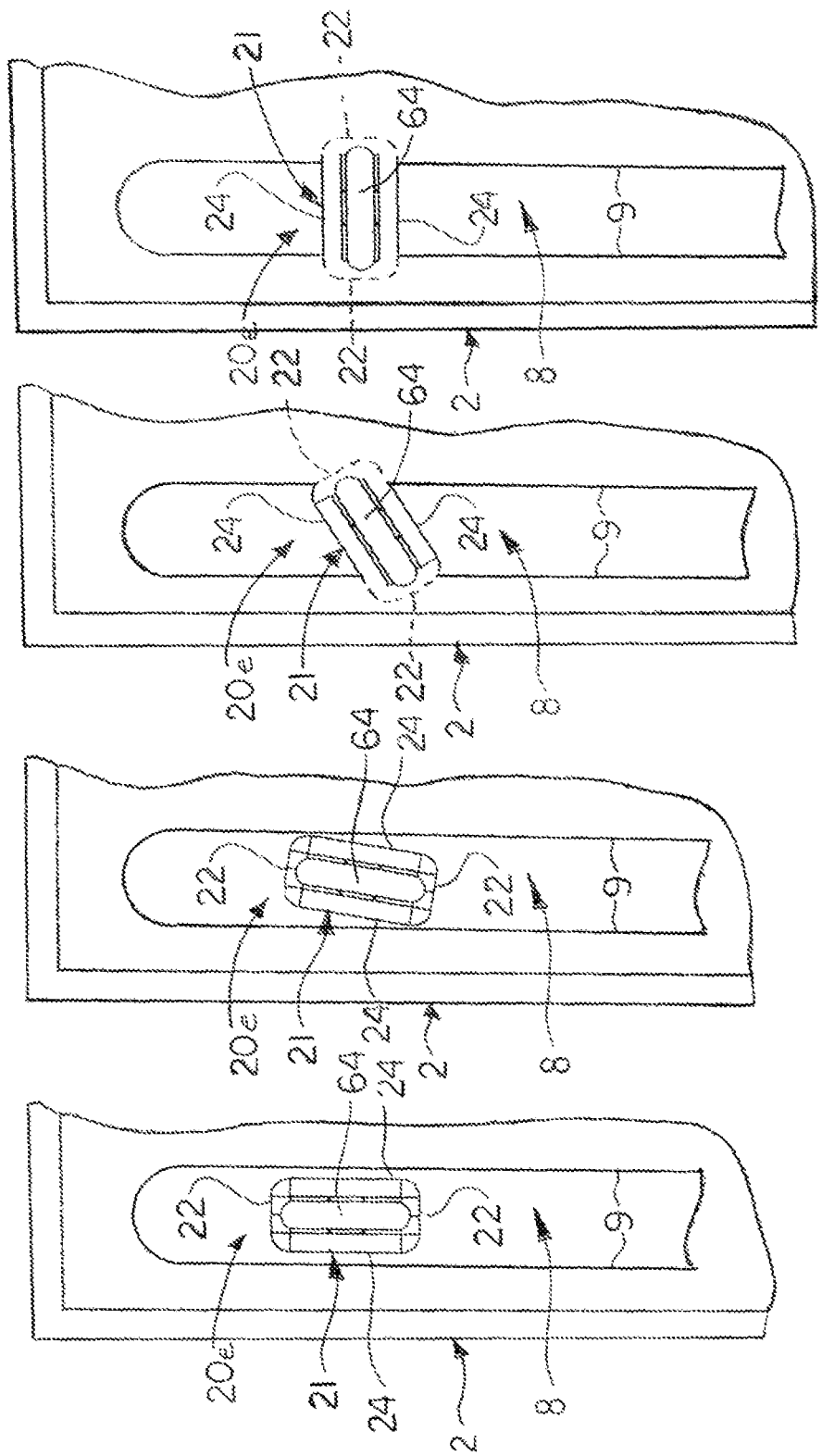

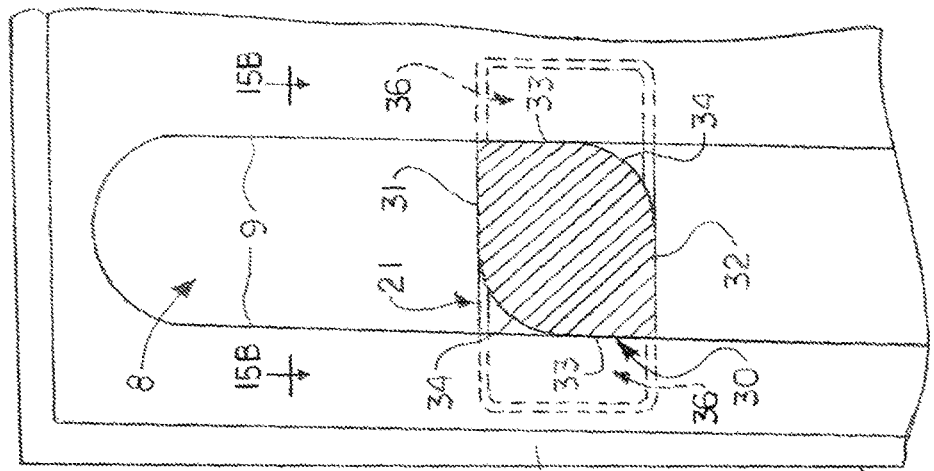
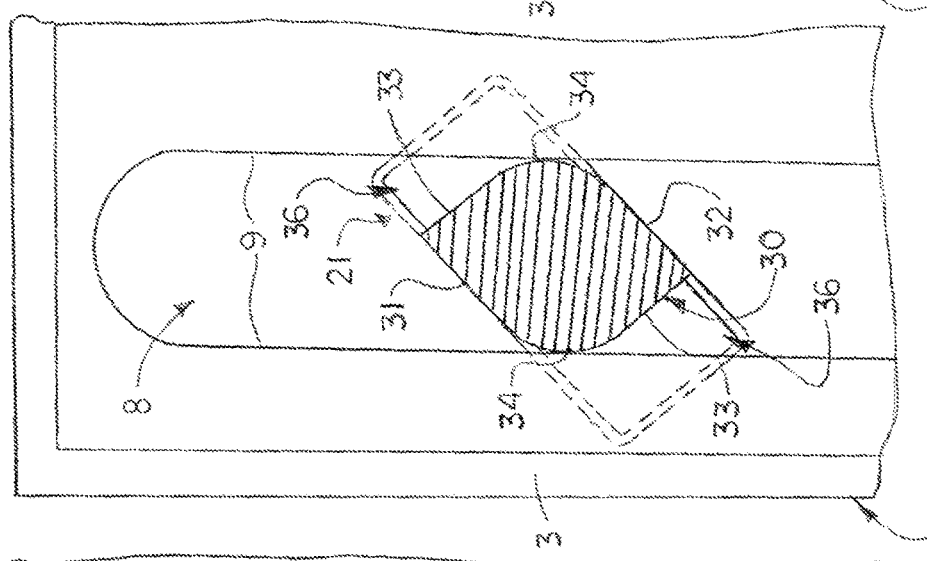
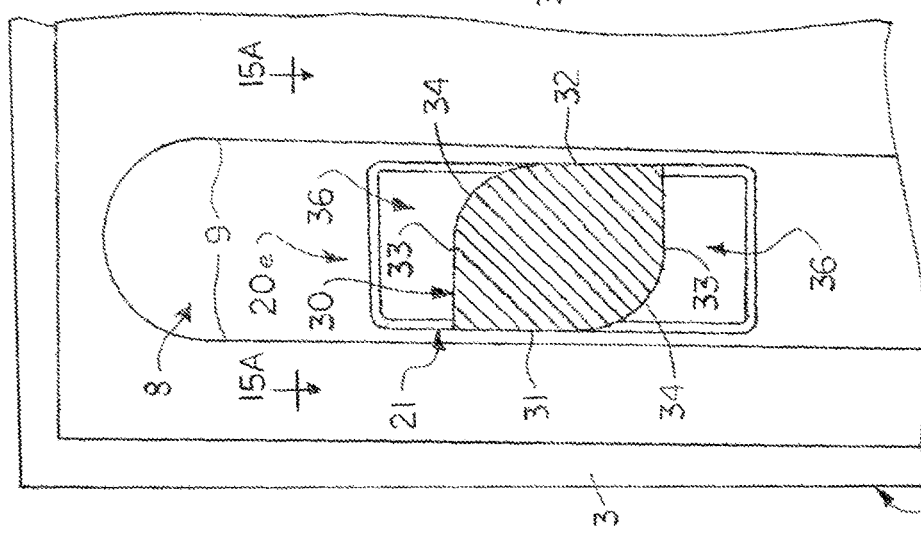

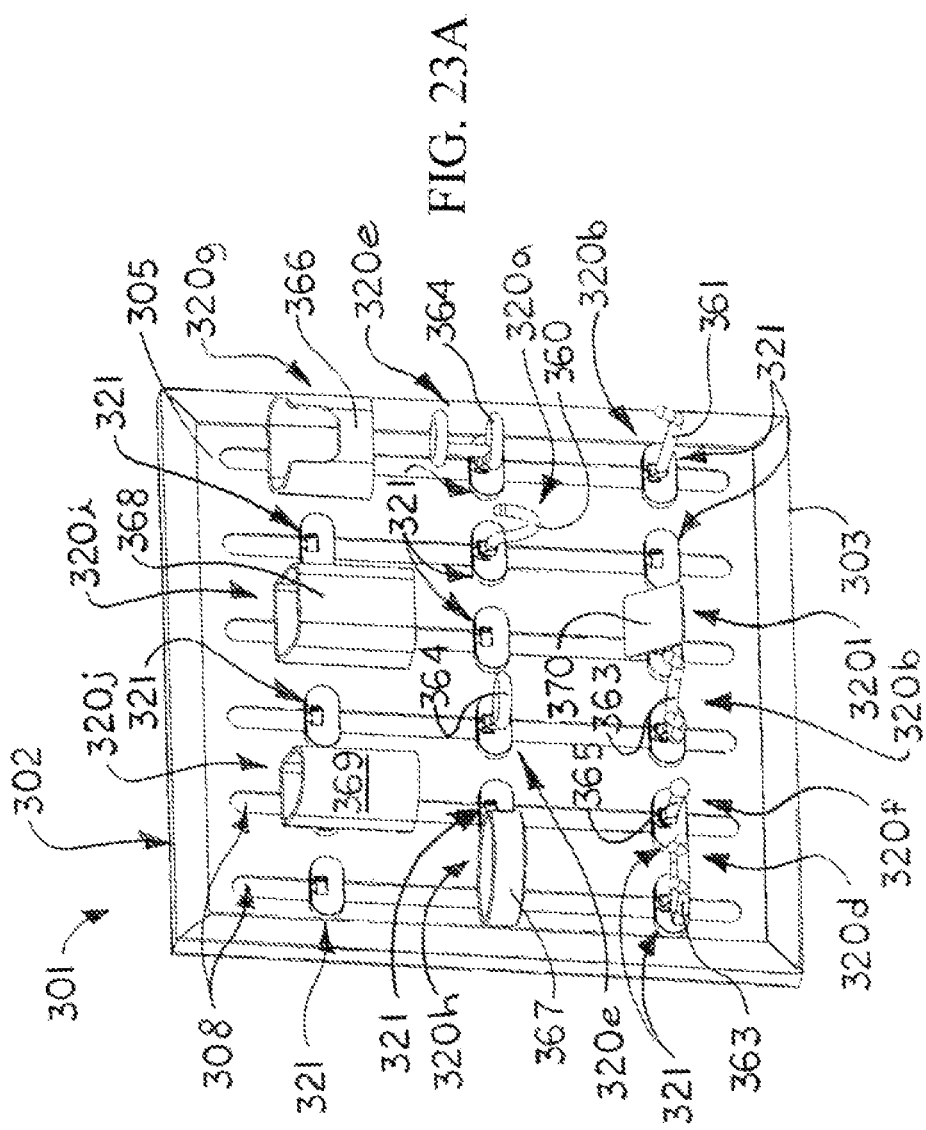

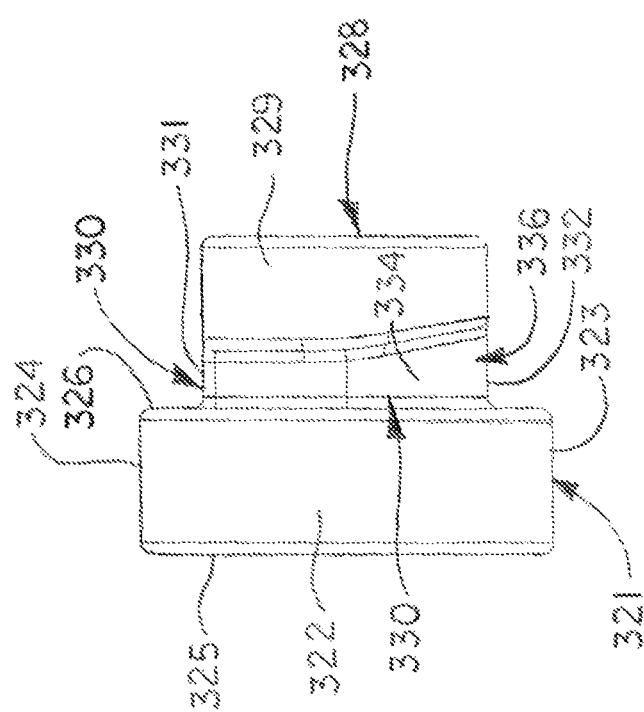

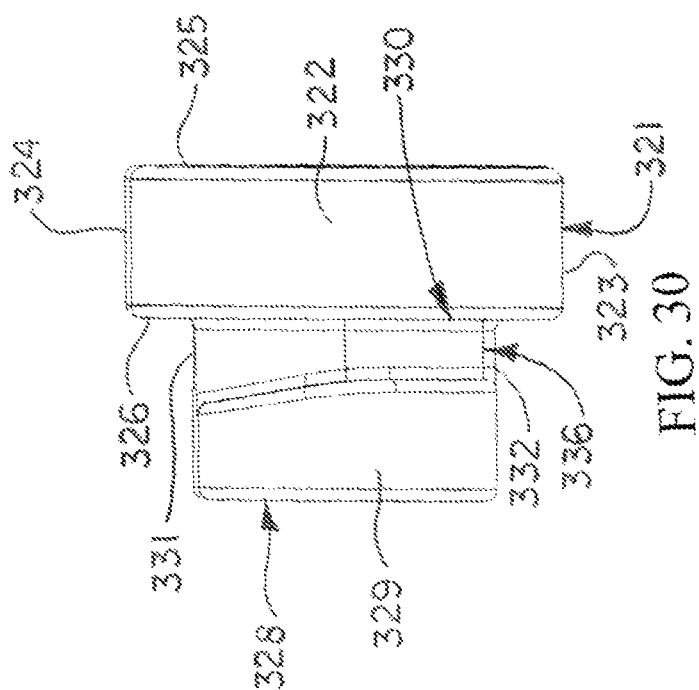

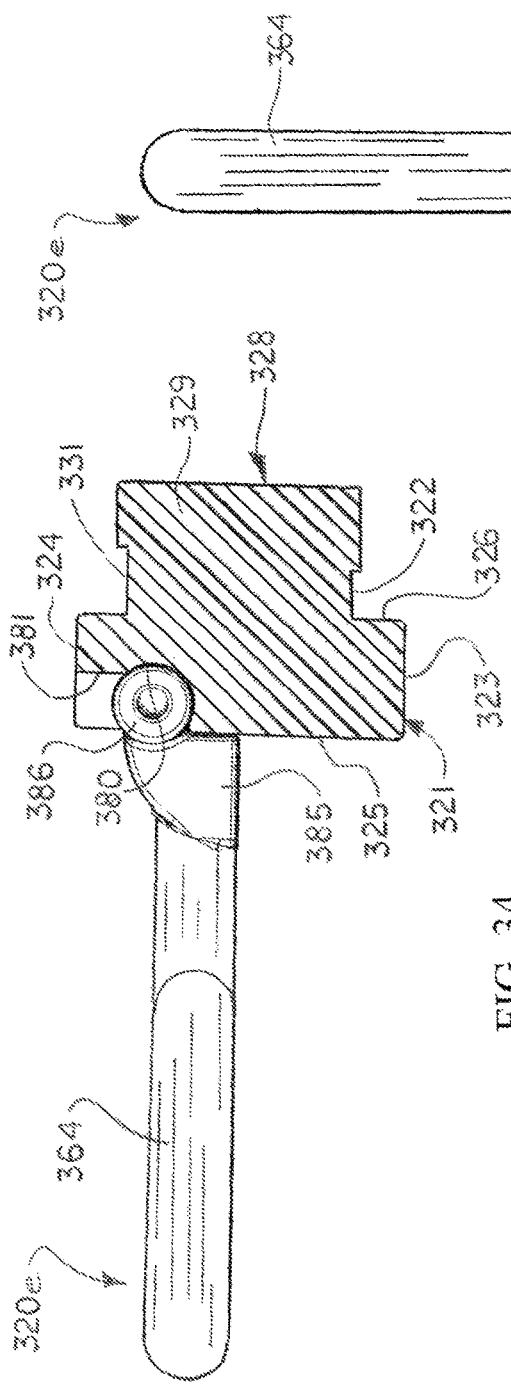
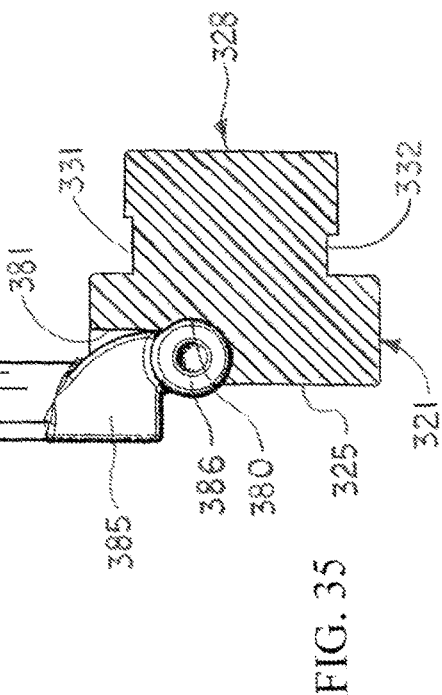
FIG. 34
FIG. 35

ARTICLE SUPPORTING ASSEMBLIES AND METHODS

CROSS-REFERENCE TO RELATED APPLICATIONS

This application claims the benefit of U.S. provisional application No. 62/337,078, filed May 10, 2016 and entitled ARTICLE SUPPORTING ASSEMBLIES AND METHODS, which provisional application is hereby incorporated by reference herein in its entirety.

FIELD

Illustrative embodiments of the disclosure generally relate to supports for various articles such as clothing, cell phones, cups and the like. More particularly, illustrative embodiments of the disclosure relate to article supporting assemblies and methods in which at least one article is supported on an article supporting assembly having an assembly base with at least one vertical mount slot and at least one article support device which engages the mount slot and supports at least one article on the assembly base.

SUMMARY

Illustrative embodiments of the disclosure are generally directed to an article supporting assembly for supporting at least one article. The article supporting assembly includes at least one assembly base having a base panel and at least one elongated, generally vertical mount slot in the base panel, the mount slot having a pair of spaced-apart slot edges. At least one article support device is detachably provided on the assembly base. The at least one article support device includes at least one support device base positional between a release position and a locked position within the mount slot. A locking mechanism includes a locking cam provided on the support device base. The locking cam has a pair of opposite cam lock surfaces engaging the slot edges, respectively, of the mount slot, in the locked position of the support device base and disengaging the slot edges, respectively, of the mount slot in the release position of the support device base. At least one article support element is carried by the support device base.

Illustrative embodiments of the disclosure are further generally directed to article supporting methods. An illustrative embodiment of the article supporting methods includes obtaining an article supporting assembly having at least one assembly base including at least one elongated, generally vertical mount slot having a pair of spaced apart slot edges; placing a support device base of at least one article support device in the mount slot; facilitating engagement of the support device base with the slot edges of the mount slot by rotating the support device base about 90 degrees from a release position to a locked position in the mount slot; and supporting at least one article on the article support device.

BRIEF DESCRIPTION OF THE DRAWINGS

Illustrative embodiments of the disclosure will now be described, by way of example, with reference to the accompanying drawings, wherein:

FIG. 3 is a front perspective view of an article support device having a typical single peg loop as an article support element.

FIG. 4 is a top view of the article support device with single peg loop illustrated in FIG. 3;

FIG. 5 is a right side view of the article support device with single peg loop;

FIG. 6 is a bottom view of the article support device with single peg loop;

FIG. 7 is a left side view of the article support device with single peg loop;

FIG. 8 is a sectional view, taken along section line 8-8 in FIG. 4, of a typical locking mechanism the support device base of the article support device with peg loop;

FIGS. 9-13 are end views of the article support device with single peg loop, more particularly illustrating typical sequential steps in orienting the support device base from a release position to a locked position for mounting of the article support device in a mount slot of the assembly base;

FIGS. 13-15 illustrate typical sequential engagement of a locking cam of the locking mechanism in the support device base of the article support device with slot edges of the mount slot in the assembly base;

FIG. 23A is a front perspective view of an alternative illustrative embodiment of the article supporting assemblies;

FIG. 29 is a left side view of the support device base illustrated in FIG. 24;

FIG. 30 is a right side view of the support device base illustrated in FIG. 24;

FIG. 34 a side view of the article support device mounted in a device head cavity provided in a support device base of an article support device, with the article support device deployed in a lowered, article-supporting position;

FIG. 35 is a side view of the article support device deployed in a raised, nonfunctional or stowage position;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "top", "bottom", "left," "rear," "right," "front," "side", "vertical," "horizontal," and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
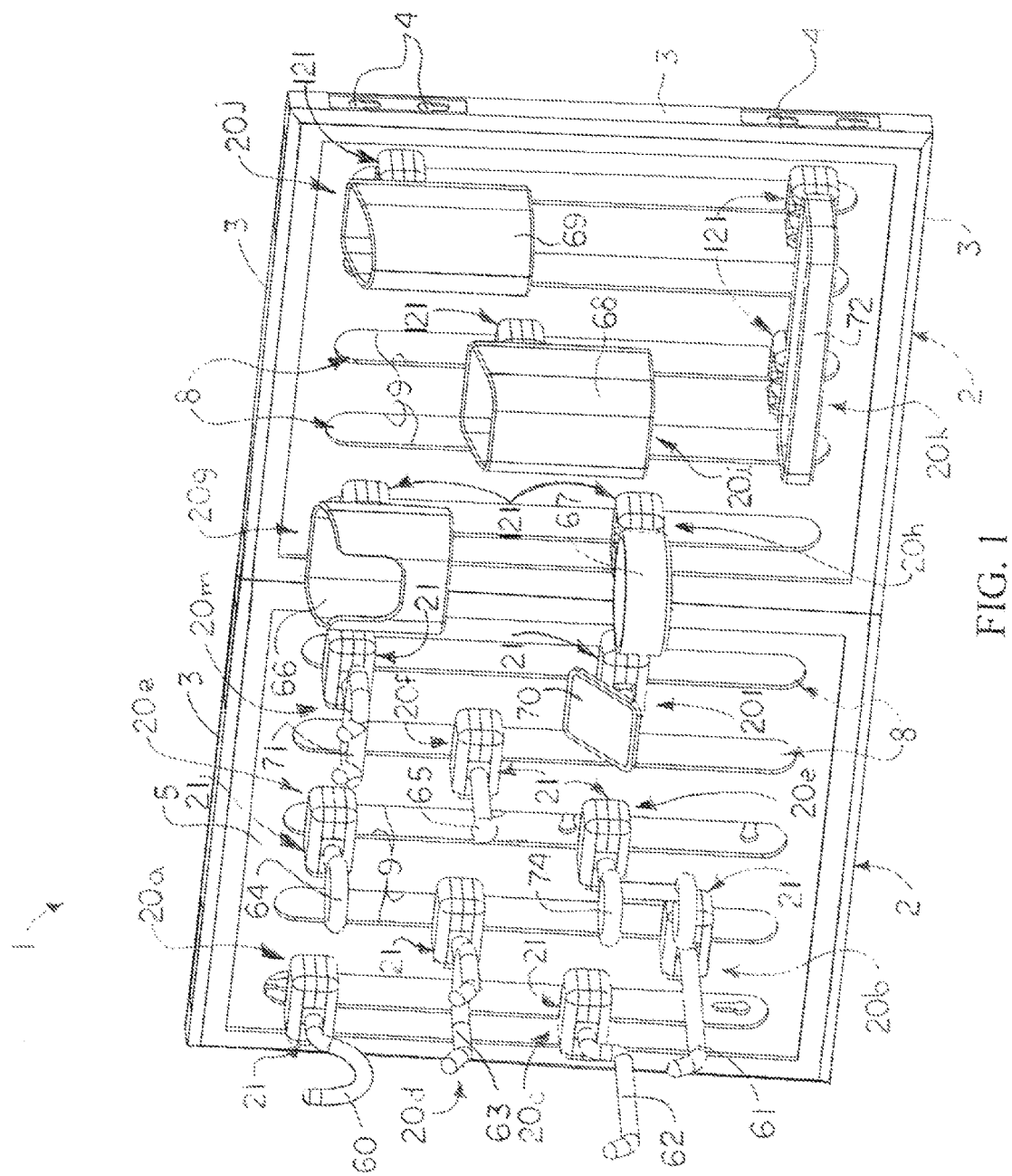
FIG. 1 is a front perspective view of an illustrative embodiment of the article supporting assemblies, with various article support devices supported on an assembly base.

Referring initially to FIGS. 1-21 of the drawings, an illustrative embodiment of the article supporting assembly, hereinafter assembly, is generally indicated by reference numeral 1. Unless otherwise noted, the various components of the assembly 1 may be fabricated of plastic, metal, wood, composites, fiberglass, other suitable materials and/or combinations thereof using conventional molding, casting, machining and/or other fabrication techniques known by those skilled in the art. The assembly 1 includes at least one assembly base 2. As illustrated in FIG. 1, in some applications of the assembly 1, multiple assembly bases 2 may be attached edgewise to each other typically in a manner which will be hereinafter described. Each assembly base 2 may include an assembly base frame 3. In some embodiments, the assembly base frame 3 may be generally square or rectangular, as illustrated. In other embodiments, the assembly base frame 3 may be round, oval, rectangular, triangular, hexagonal or other polygonal of non-polygonal shape. In some embodiments, at least one peg opening 4 may be provided in at least one side surface of the assembly base frame 3. The peg openings 4 may facilitate edgewise or adjacent attachment of multiple assembly bases 2 to each other typically by insertion of at least one peg (not illustrated) into the registering peg openings 4 in the respective assembly bases 2. A base panel 5 may be mounted in the assembly base frame 3 of the assembly base 2. At least one mount slot 8 may extend through the base panel 5. In some embodiments, multiple, elongated, parallel and adjacent mount slots 8 may extend through the base panel 5, as illustrated in FIG. 1. Each mount slot 8 has a pair of spaced-apart, parallel, adjacent slot edges 9.

Figure 17:
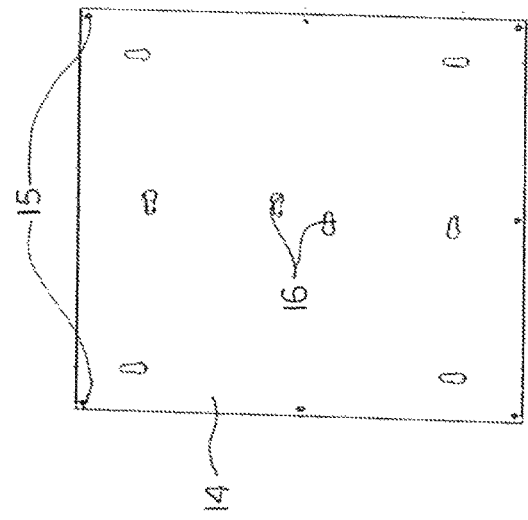
FIG. 17 is a front view of a typical backing plate for the assembly base.
Figure 16:
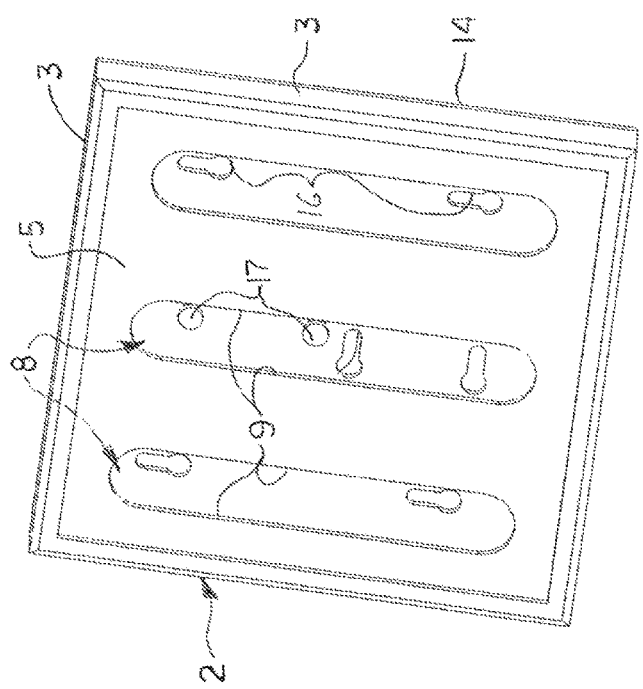
FIG. 16 is a front perspective view of a typical assembly base mounted to a backing plate according to an exemplary technique or method of mounting the article supporting assembly on a support surface (not shown)
Figure 18:
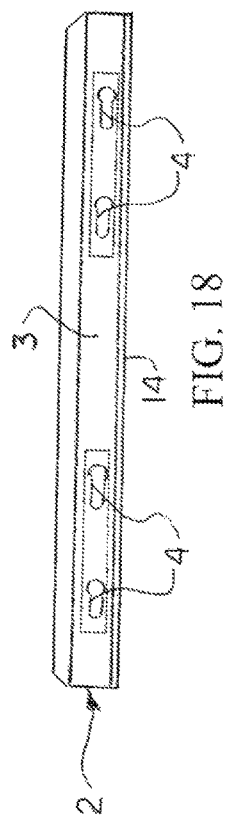
FIG. 18 is an edge view of the assembly base mounted on the backing plate.

As illustrated in FIGS. 16-18, in some embodiments, the assembly base 2 may be mounted on a backing plate 14. Multiple plate fastener openings 15 may extend through the backing plate 14 to facilitate attachment of the assembly base 2 to the backing plate 14 using multiple plate fasteners (not illustrated). At least one peg opening 16 may extend through the backing plate 14 in a selected number and pattern to facilitate attachment or mounting of the backing plate 14 to a wall or other flat surface or structure (not illustrated) using at least one mount peg 17 (FIG. 16).

As further illustrated in FIG. 1, at least one article support device 20a-20m may engage at least one mount slot 8 in the assembly base 2 to support at least one article (not illustrated) such as an article of clothing, a cell phone, cup or the like, for example and without limitation. Each article support device 20a-20m may include a support device base 21 which is adapted to detachably engage the mount slot 8, typically in a manner which will be hereinafter described. Various article support elements 60-72 may extend from each support device base 21. Accordingly, the article support device 20a includes a curved hook 60 which extends from the support device base 21. The article support device 20b includes a straight hook 61 which extends from the support device base 21. The article support device 20c includes a deep hook 62 which extends from the support device base 21. The article support device 20d includes a double hook 63 which extends from the support device base 21. The article support device 20e includes a single peg loop 64 which extends from the support device base 21. The article support device 20f includes a rounded peg 65 which extends from the support device base 21. The article support device 20g includes a cell phone holder 66 which is provided on the support device base 21. The article support device 20h includes, a cup holder 67 which is provided on the support device base 21. The article support device 20i includes a deep basket 68 which is provided on the support device base 21. The article support device 20j includes a narrow basket 69 which is provided the support device base 21. The article support device 20k includes a tray 72 which is provided on a pair of support device bases 121. The article support device 20l includes a peg magnet 70 which is provided on the support device base 21. The article support device 20m includes a wide loop 71 which is provided on the support device base 21. The article support device 20n includes a double peg loop 74 which extends from the support device base 21. Accordingly, various articles can be supported on the respective article support devices 20a-20m typically in a manner which will be hereinafter described. It will be recognized and understood by those skilled in the art that the article support elements 60-72 illustrated in FIG. 1 are non-limiting, examples of possible article support elements which may extend from the support device base 21 of each article support device 20, and article support elements of alternative design may from the support device bases 21 depending on the types of articles which are to be supported by the article support devices 20.

As illustrated in FIGS. 3-8, in some embodiments, the support device base 21 of each article support device 20 may be generally elongated and rectangular in shape. Accordingly, the support device base 21 may have a pair of base sides 22, a base bottom 23 and a base top 24 which extend between the base sides 22, and a base front 25 and a base rear 26. The article support element 60-72 may extend from or be attached to the base front 25 according to the knowledge of those skilled in the art. Alternatively, the article support element 60-72 may be attached to one of the base sides 22, the base bottom 23 and/or the base top 24.

A locking mechanism 28 may be provided on the base rear 26 of the support device base 21. In some embodiments, the locking mechanism 28 may include a cam plate 29 which is generally elongated and disposed in parallel and, spaced-apart relationship to the base rear 26. A locking cam 30 may extend between the base rear 26 of the support device base 21 and the cam plate 29. A cam slot 36 may be defined by and between the base rear 26 of the support device base 21 and the cam plate 29 on each corresponding side of the locking cam 30. As illustrated in FIG. 8, the locking cam 30 may have a top cam surface 31 and a bottom cam surface 32 which may be generally coplanar or flush with respect to the respective base top 24 and base bottom 23 of the support device base 21. A pair of generally flat or planar cam lock surfaces 33 may extend from the top cam surface 31 and the bottom cam surface 32, respectively, in generally parallel and, offset relationship to each other. The cam lock surfaces 33 may be generally perpendicular or 90 degrees with respect to the top cam surface 31 and the bottom cam surface 32, respectively. A pair of generally curved cam transition surfaces 34 may extend from the respective cant lock surfaces 33. The cam transition surfaces 34 may establish continuity between each of the top cam surface 31 and the bottom cam surface 32 and the corresponding cam lock surface 33. Therefore, as further illustrated in FIG. 8, the cam lock surface 33 and the cam transition surface 34 can each side of the locking cam 30 may be a mirror image of the cam lock surface 33 and the cam transition surface 34 on the opposite side of the locking cam 30 across a plane of symmetry 46 which extends diagonally through the locking cam 30. Each cam lock surface 33 and cam transition surface 34 pair faces the corresponding cam slot 36.

As illustrated in FIGS. 9-15B, each article support device 20a-20m may be amounted in a mount slot 8 of the assembly base 2 typically as follows. As illustrated in FIGS. 9 and 13, the support device base 21 of the article support device 20a-20m may initially be placed and held in the release position within the mount slot 8 with the longitudinal axis of the support device base 21 parallel to the longitudinal axis of the mount slot 8. Accordingly, as illustrated in FIG. 13, the top cam surface 31 and the bottom cam surface 32 of the locking cant 30 are disposed in parallel, adjacent and spaced-apart relationship to the respective slot edges 9 of the mount slot 8. The support device base 21 may be held and raised or lowered to the desired height or vertical position within the mount slot 8 which corresponds to the desired height or vertical position of the article which is to be supported by the article support device 20a-20m. As illustrated in FIG. 15A, in the release position, the cam slots 36 on the opposite sides of the locking cam 30 align or register with the respective opposite slot edges 9 of the mount slot 8.

Figure 15B:
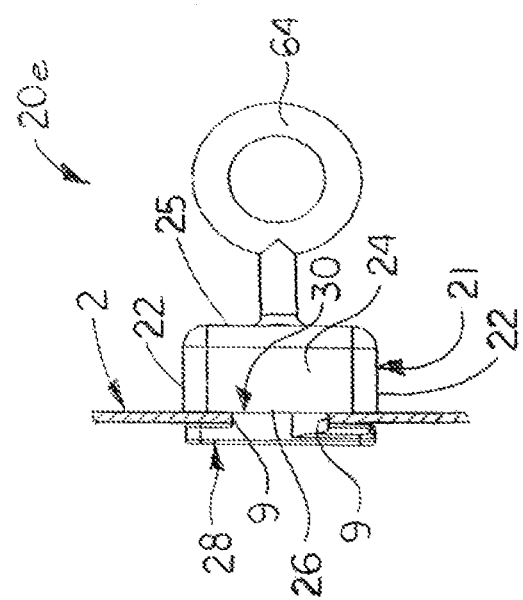
FIG. 15B is a sectional view of a locking cam on the locking mechanism of the article support device, taken along section lines 15B-15B in FIG. 13, with the locking cam in the locked position.
Figure 15A:
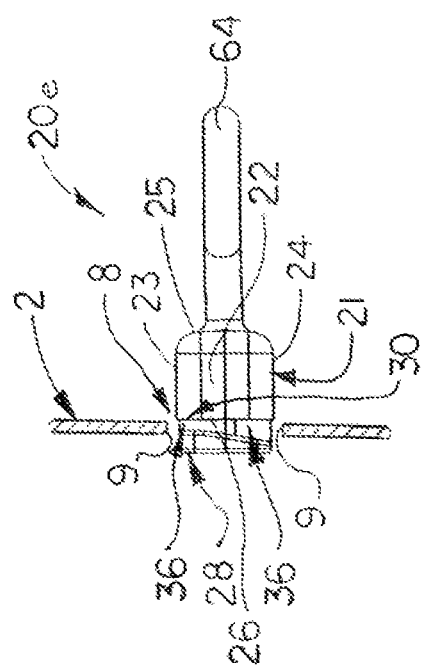
FIG. 15A is a sectional view of a locking cam on the locking mechanism of the article support device, taken along section lines 15A-15A in FIG. 13, with the locking cam in the release position.

As illustrated in FIGS. 10-12, 14 and 15, the support device base 21 may next be rotated within the mount slot 8 about 90 degrees from the vertical release position of FIGS. 9 and 13 to the horizontal locked position of FIGS. 12 and 15. Accordingly, as illustrated in FIGS. 15 and 15B, the respective earn slots 36 receive the respective slot edges 9 of the mount slot 8. As illustrated in FIG. 14, as the support device base 21 is rotated from the release position (FIG. 13) to the locked position (FIG. 15), the top cam surface 31 and the bottom cam surface 32 disengage and the cam transition surfaces 34 of the locking cam 30 initially engage the respective slot edges 9. As rotation of the support device base 21 continues, the locking cam 30 transitions from the cam transition surfaces 34 to the cam lock surfaces 33, which then engage the respective opposite slot edges 9 of the mount slot 8, with the top earn surface 31 and the bottom cam surface 32 disengaging upwardly and downwardly, respectively. The width of the locking cam 30 may be selected such that the earn lock surfaces 33 frictionally engage the respective slot edges 9 of the mount slot 8. Accordingly, the slot edges 9 of the mount slot 8 frictionally engage the respective cam lock surfaces 33 of the locking cam 30 and support the support device base 21 and the article support device 20a-20m at the selected height or vertical position within the mount slot 8. The article (not illustrated) can then be suspended from, placed in or attached to the article support element 60-72 for support and stowage of the article. The article can be selectively retrieved from the article support element 60-72 for use and subsequently replaced on the article support element 60-72 for continued stowage, as desired.

The support device base 21 of the article support device 20a-20m can be selectively subsequently removed from the mount slot 8 by rotating the support device base 21 in the opposite direction from the locked position of FIG. 15 to back to the release position of FIG. 13. Accordingly, the cam lock surfaces 33 on the locking cam 30 transition back to the respective cam transition surfaces 34 and disengage the slot edges 9 as the cam transition surfaces 34 subsequently engage the flat edges 9, as illustrated in FIG. 14. Continued rotation of the support device base 21 orients the support device base 21 in the vertical orientation of the release position, as illustrated in FIG. 13, with the top cam surface 31 and the bottom cam surface 32 spaced-apart and adjacent to the respective slot edges 9, to facilitate removal of the support device base 21 from the mount slot 8. Alternatively, the support device base 21 can be selectively vertically repositioned in the mount slot 8 for subsequent rotation from the release position back to the locked position and reengagement of the locking cam 30 with the slot edges 9 of the mount slot 8 at the selected height.

Referring next to FIGS. 16-18 of the drawings, in some applications, a backing plate 14 may facilitate mounting of the assembly base 2 on a wall or other flat support surface not illustrated) in a borne or office setting, for example and without limitation. Accordingly, plate fasteners (not illustrated) may be extended through the. respective plate fastener openings 15 and threaded into registering fastener openings (not illustrated) in the assembly base 2. to facilitate mounting or attachment of the assembly base 2 to the backing plate 14. Mount pegs 17 (FIG. 16) may be extended through one or more of the peg openings 16 in the backing plate 14 and into respective registering openings (not illustrated) in the support surface to facilitate mounting of tile backing, plate 14 to the support surface. The various articles may then be attached to or placed in the article support elements 60-72 of the various article support devices 20a-20m, as will be hereinafter described.

Figure 21:
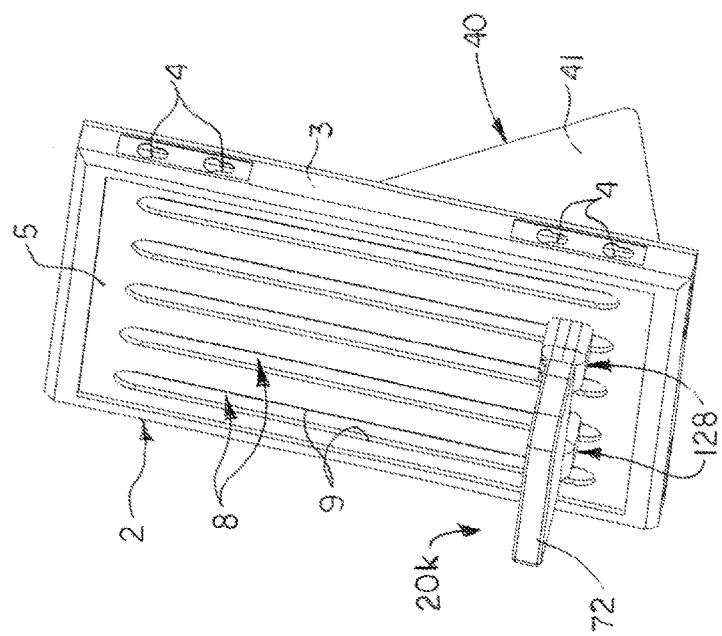
FIG. 21 is a front perspective view of the assembly base with an article support device having a tray mounted to a pair of mount slots in the assembly base and the assembly base deployed in a generally upright and angled orientation on the stand in typical application of the article supporting assemblies.
Figure 19:
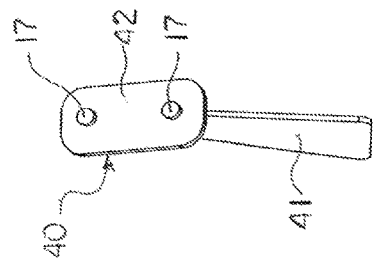
FIG. 19 is a front perspective view of a typical stand which can be used to mount the assembly base in a generally upright orientation on a flat surface in some applications of the article supporting assemblies.
Figure 20:
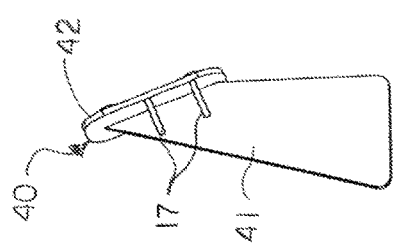
FIG. 20 is a side perspective view of the stand.

Referring next to FIGS. 19-21 of the drawings, in some applications, the assembly base 2 may be deployed in a generally upright position on a support surface (not illustrated). Accordingly, a stand 40 which is suitable for the purpose may include a stand base 41. A stand plate 42 may be mounted on the stand base 41. Mount pegs 17 may be extended through the peg openings 16 (FIG. 16) in the backing plate 14 and through registering peg openings (not illustrated) in the stand plate 42 to mount the assembly base 2 on the stand 40. Various article support devices 20a-20m, such as the article support device 20k having the tray 72, for example and without limitation, may be mounted in the mount slots 8 in the assembly base 2 typically as was heretofore described.

Figure 2B:
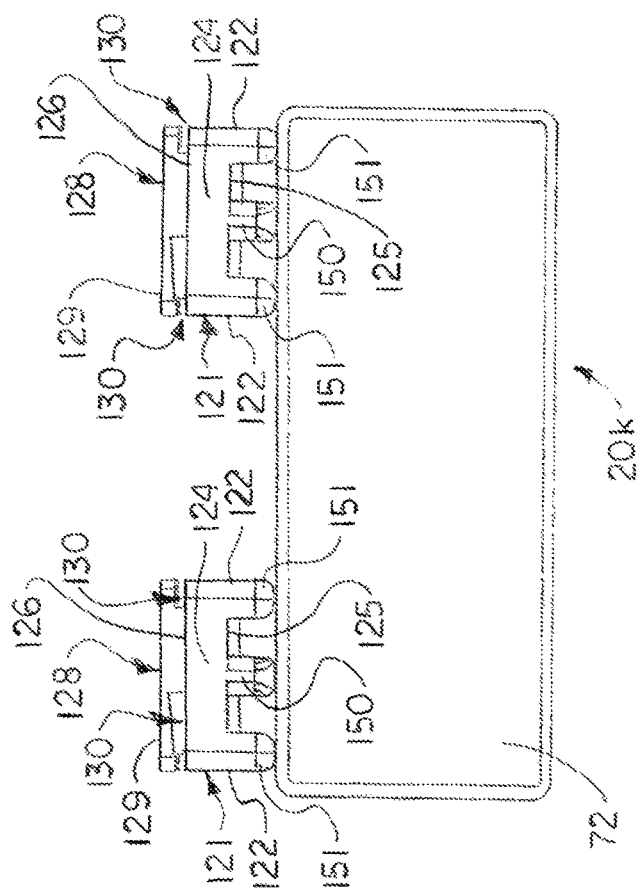
FIG. 2B is a top view of the article support device illustrated in FIG. 2A, detached from the assembly base (not shown)
Figure 2A:
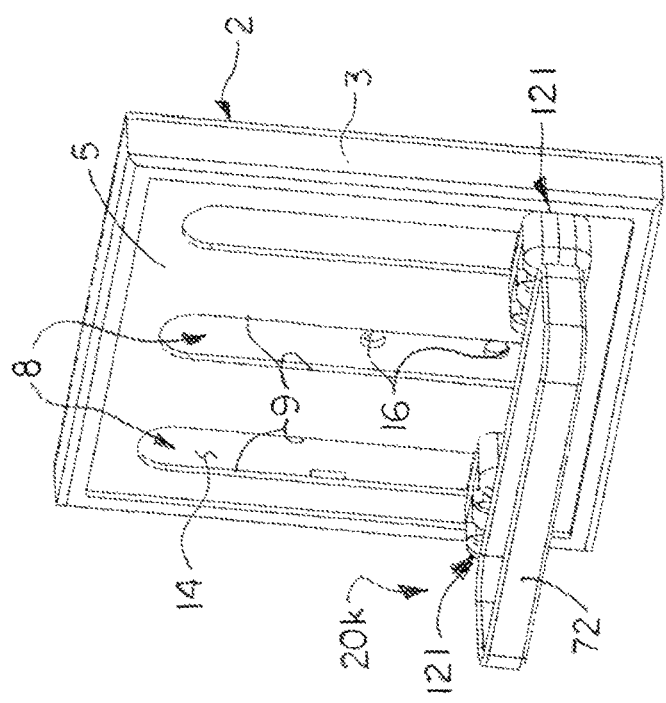
FIG. 2A is is front perspective view of an illustrative article supporting assembly with an article support device having a tray supported on the assembly base.

Referring next to FIGS. 2A and 2B of the drawings, the article support device 20k having the tray 72 may include a pair of spaced-apart support device bases 121 which are designed for the purpose of supporting the tray 72 on the assembly base 2 by engaging respective mount slots 8 in the base panel 5. In FIGS. 2A and 2B. reference numerals in the 121-136 series designate the various elements of each support device base 121 which correspond to the same respective elements of the support device base 21 designated by reference numerals 21-36, respectively, in FIGS. 3-8. As particularly illustrated in FIG. 2B, each support device base 121 may include a pair of spaced-apart side base protrusions 151 which extend from the base front 125 of the support device base 121. A middle base protrusion 150 may extend from the base front 125 between the side base protrusions 151. The tray 72 may be rotatably attached to the middle base protrusion 150 of each support device base 121 according to the knowledge of those skilled in the art to facilitate the selective vertical and horizontal release and locked position orientations of each support device base 121 within a corresponding mount slot 8 in the assembly base 2 and mounting of the support device bases 121 in the respective mount slots 8 and the tray 72 on the assembly base 2, typically in the same manner as was heretofore described with respect to the support device base 21 in FIGS. 9-15. In some embodiments, a support device base 121 may rotatably attach the cell phone holder 66, the cup holder 67, the deep basket 68 and the narrow basket 69 (FIG. 1) to the assembly base 2. Accordingly, the cell phone holder 66, the cup holder 67, the deep basket 68 or the narrow basket 69 may be selectively adjusted to a selected rotational position relative to the support device base 121 according to the preferences of the user.

Referring again to FIG. 1 of the drawings, in typical application of the assembly 1, one or more of the article support devices 20a-20m may be mounted on the assembly base 2 of the assembly 1 in selected positions to support one or more articles (not illustrated) such as clothing, cell phones or cups, for example and without limitation. Each article support device 20a-20m may be mounted to the assembly base 2 by engagement of the support device base 21 with a mount slot 8 by rotation of the support device base 21 from the release position to the locked position, typically as was heretofore described with respect to FIGS. 9-15. It will be appreciated by those skilled in the art that the article support device or devices 20a-20m may be selected for attachment to the assembly has 2 according to the type of article support element 60-72 which extends from the support device base 21 of the article support device 20 and the type of article which is to be supported on the assembly base 2. For example, and without limitation, articles of clothing such as coats, shirts, caps, hats or the like may be supported on the curved hook 60 of the article support device 20a, the straight hook 61 of the article support device 20b, the deep hook 62 of the article support device 20c or the rounded peg 65 of the article support device 20f. An article may be magnetically attached to the peg magnet 70 of the article support device 20l. Various items (not illustrated) such as pens and/or pencils, for example and without limitation, may be placed in the deep basket 68 of the article support device 20i or the narrow basket 69 of the article support device 20j. A cell phone (not illustrated) may be placed in the cell phone holder 66 of the article support device 20g. A beverage-containing cup (not illustrated) may be placed in the cup holder 67 of the article support device 20h. Accordingly, the various articles are securely supported by the respective article support devices 20a-20m on the assembly base 2 for stowage until they are subsequent retrieved and used. After use, the articles can be selectively replaced on the article support devices 20a-20m for continued stowage.

Figure 22:
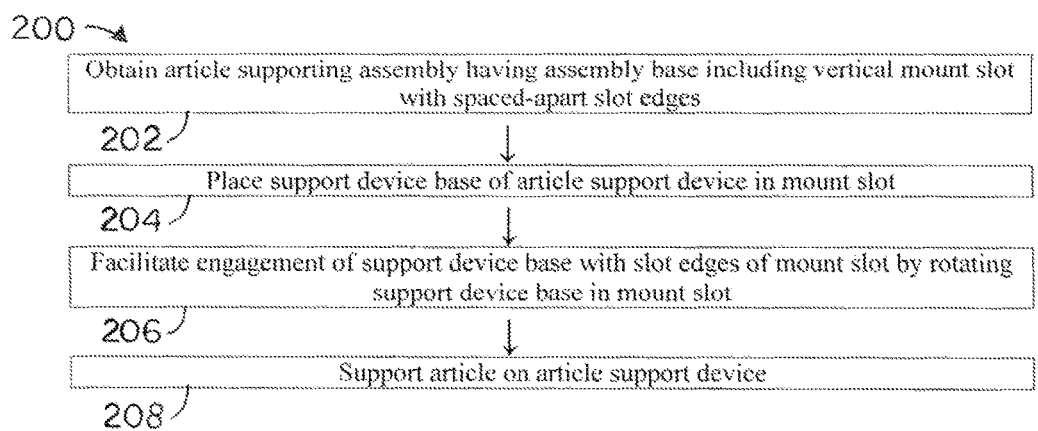
FIG. 22 is a flow diagram which illustrates an illustrative embodiment of the article supporting methods.

Referring next to FIG. 22 of the drawings, a flow diagram 200 which illustrates an illustrative embodiment of the article supporting methods is illustrated. At Step 202, an article supporting, assembly having an assembly base may be obtained. The assembly base may include at least one elongated, generally vertical mount slot having a pair of spaced apart slot edges. At Step 204, a support device base of at least one, article support device may be placed at a selected height or vertical position within the mount slot. At Step 206, engagement of the support device base with the slot edges of the mount slot may be facilitated by rotating the support device base about 90 degrees from a release position to a locked position in the mount slot. At Step 208, at least one article may be supported on or in the article support device. In subsequent steps, the article supporting assembly may be removed from the mount slot by rotation of the support device base from the locked position to the release position. Alternatively, the article supporting assembly may be vertically repositioned in the mount slot by rotation of the support device base from the locked position to the release position, vertical adjustment of the support device base in the mount slot and rotation of the support device base back to the locked position at the selected height or vertical position.

Figure 23B:
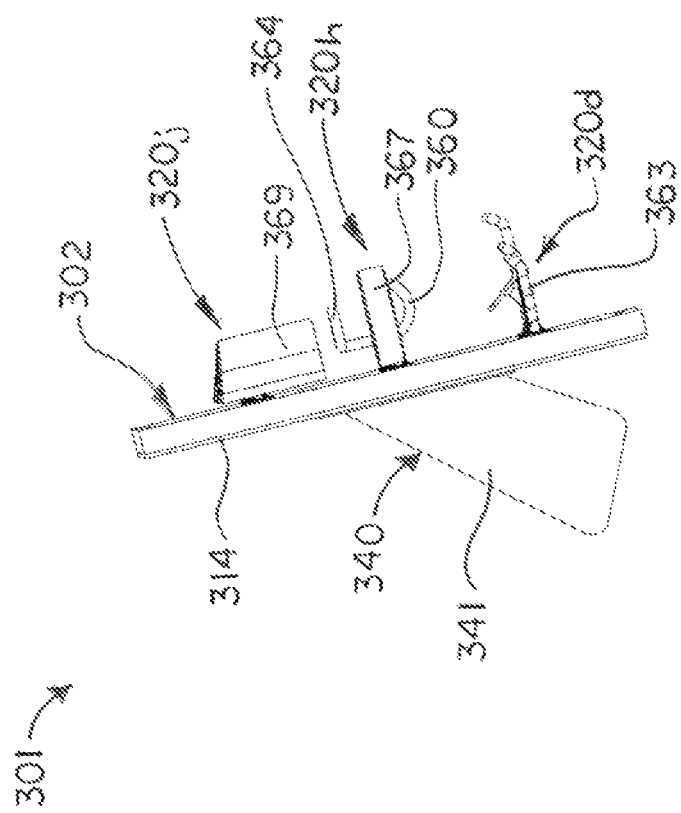
FIG. 23B is a side view of the illustrative article supporting assembly illustrated in FIG. 23A.
Figure 24:
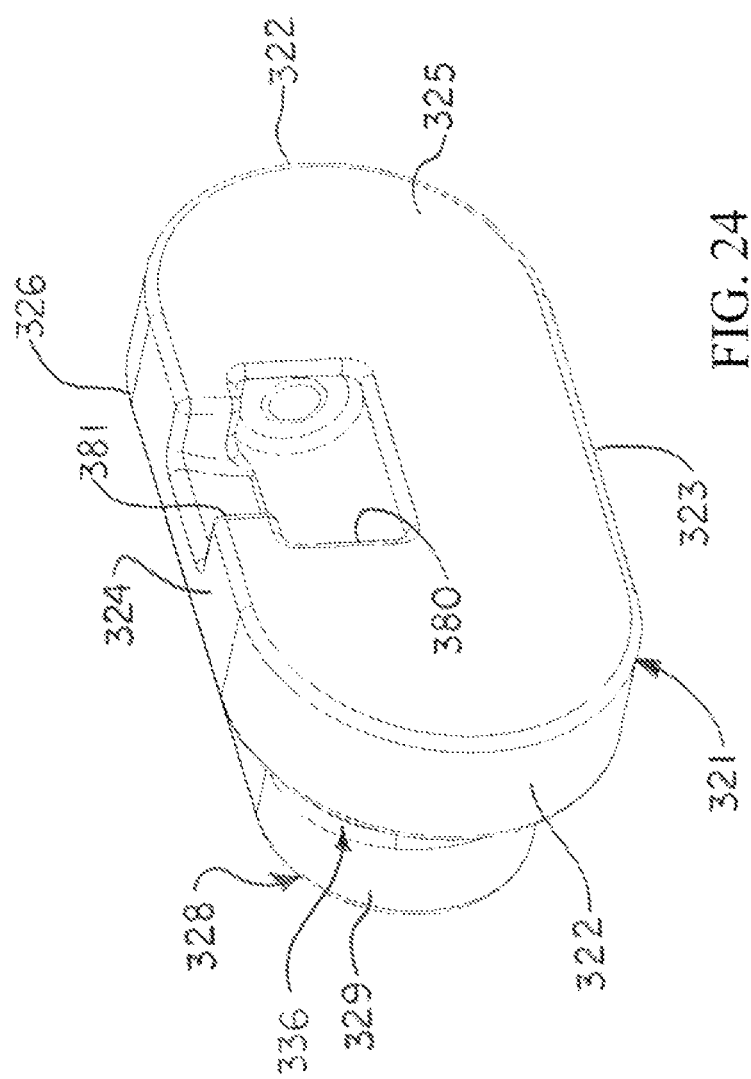
FIG. 24 is a front perspective view of as typical support device base and locking mechanism for the article supporting assembly illustrated in FIG. 23.
Figure 25:
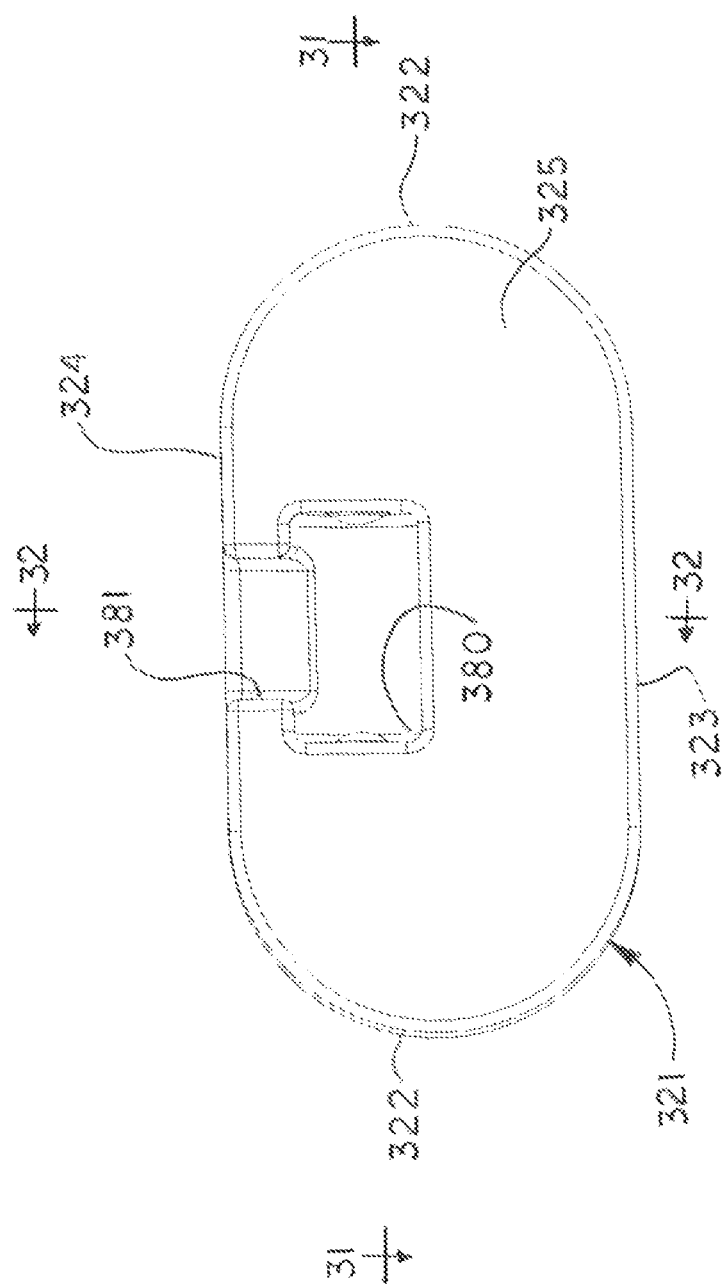
FIG. 25 is a front view of the support device base illustrated in FIG. 24.
Figure 26:
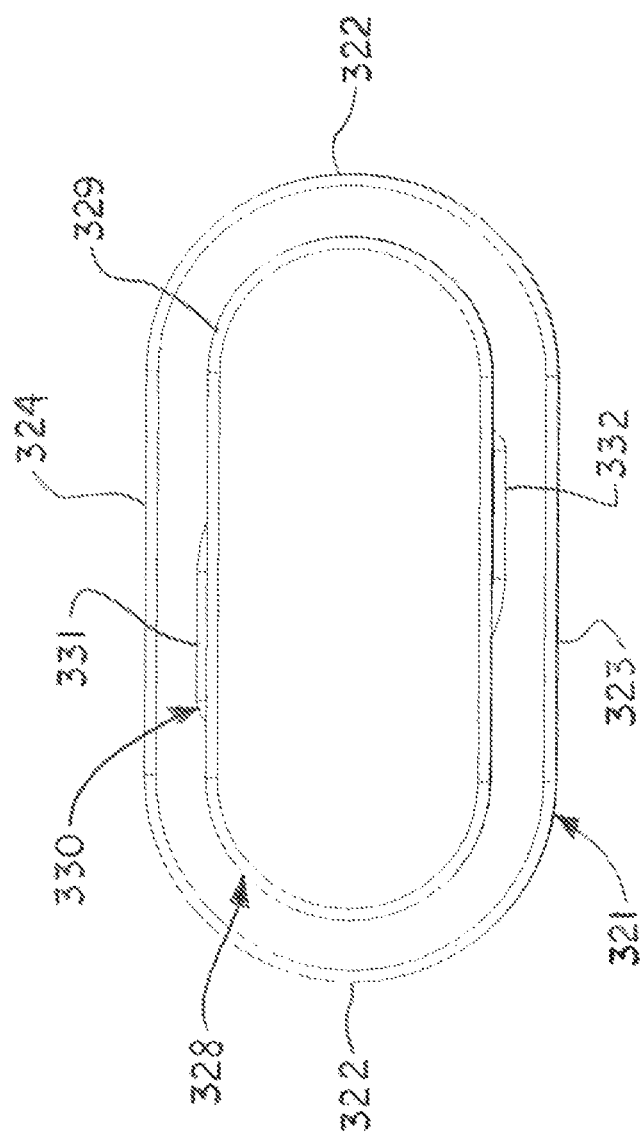
FIG. 26 is a rear view of the support device base illustrated in FIG. 24.
Figure 27:
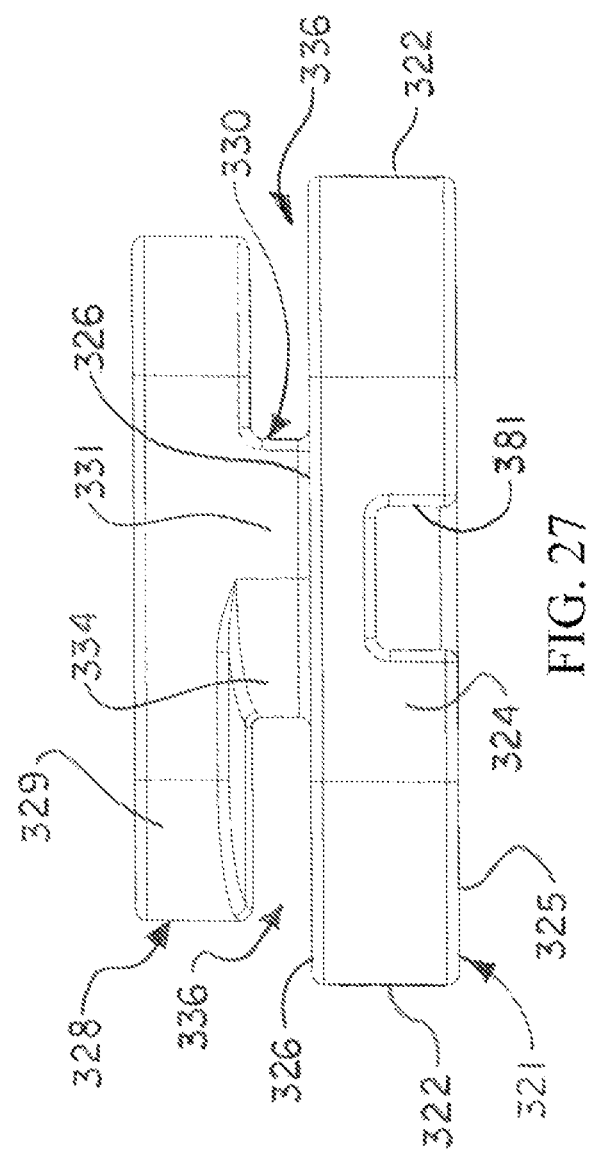
FIG. 27 is a top view of the support device base illustrated in FIG. 24.
Figure 28:
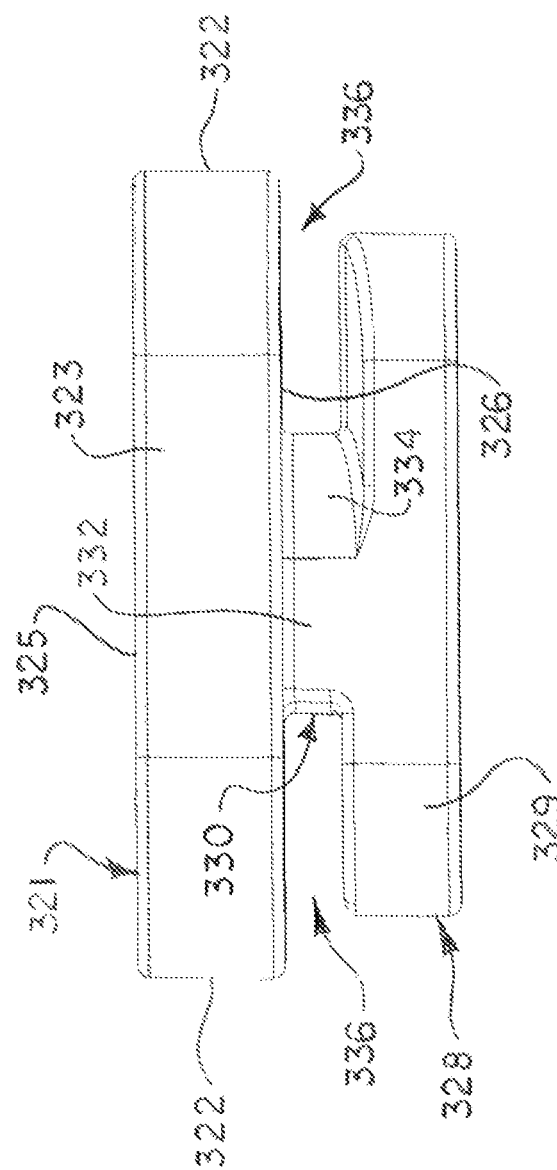
FIG. 28 is a bottom view of the support device base illustrated in FIG. 24.
Figure 32:
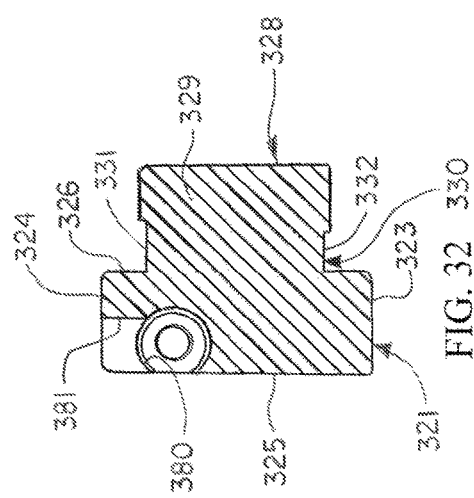
FIG. 32 is a transverse sectional view, taken along section lines 32-32 in FIG. 25, of the support device base.
Figure 36:
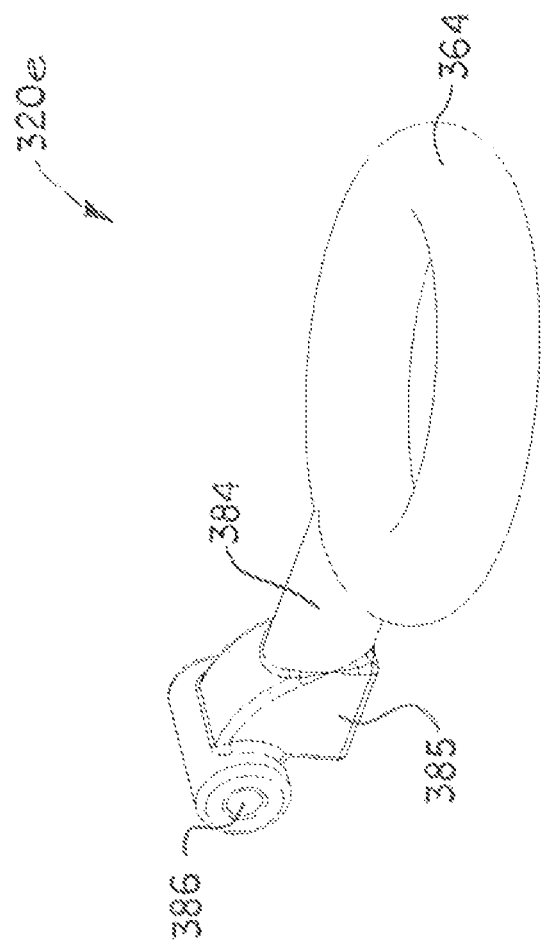
FIGS. 36-48 are perspective views of various typical article support devices of the illustrative article supporting assembly illustrated in FIG. 23.
Figure 37:
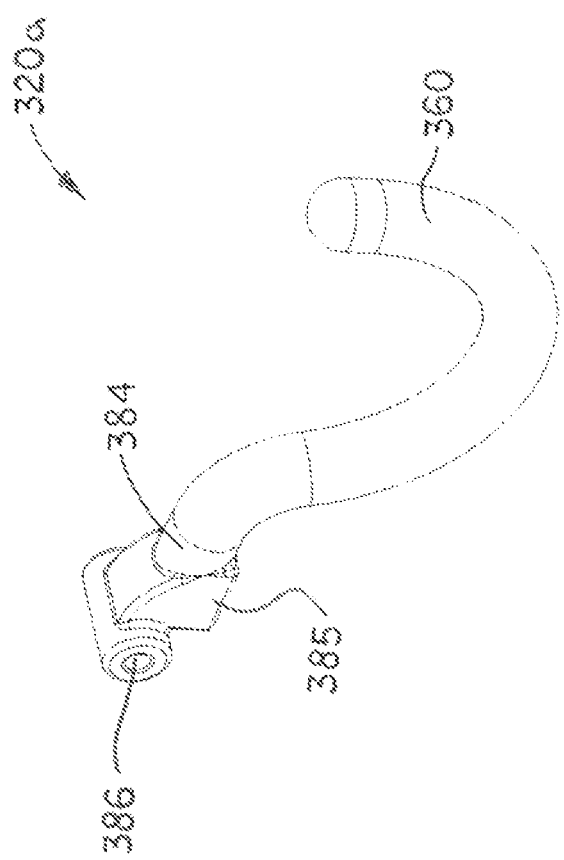
Figure 38:
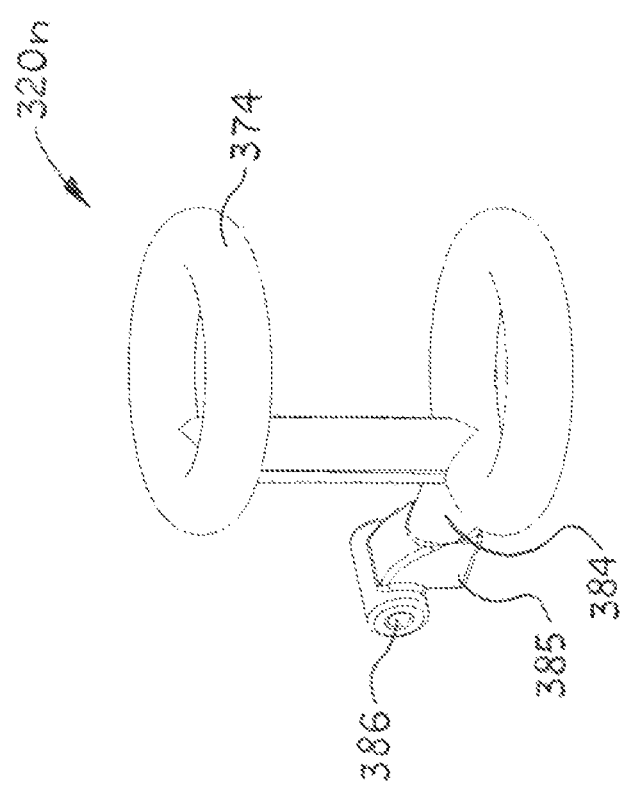
Figure 39:
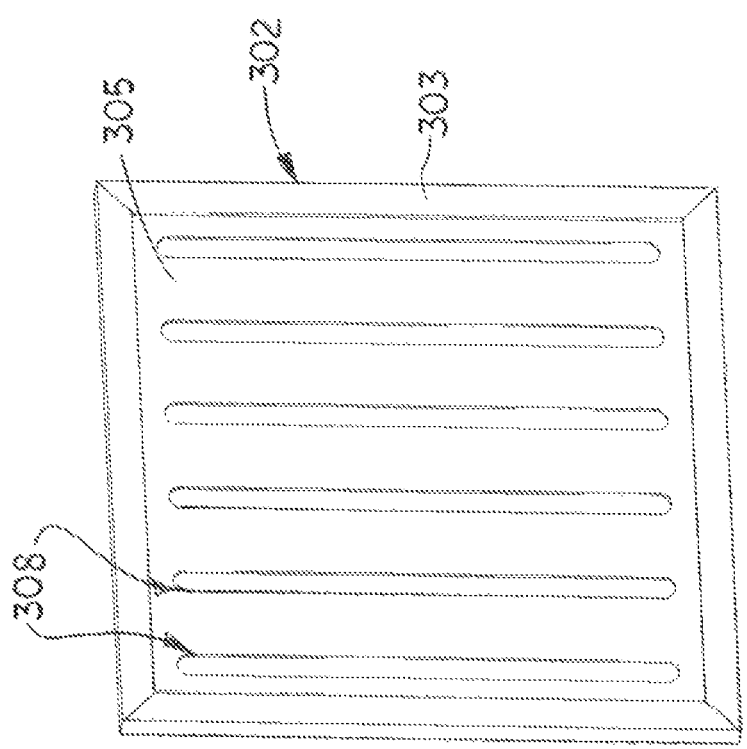
Figure 40:
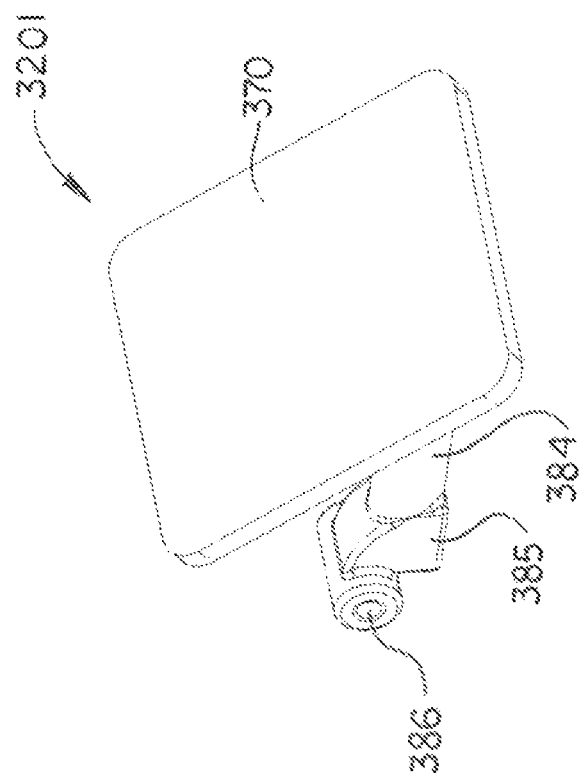
Figure 41:
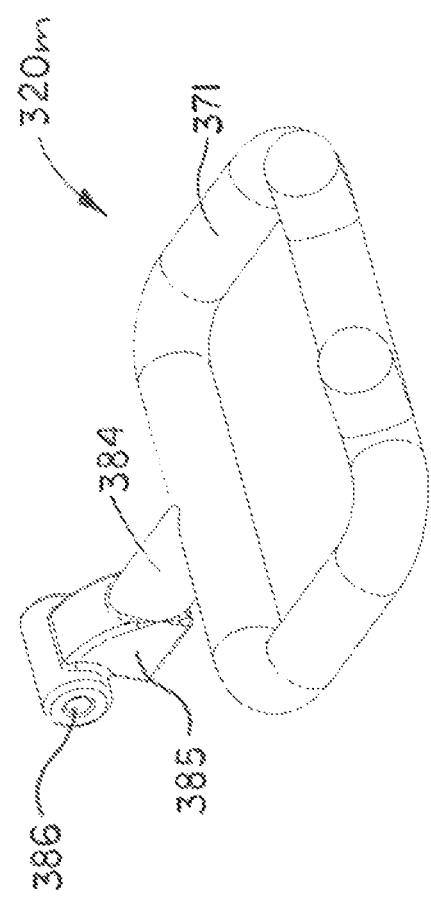
Figure 42:
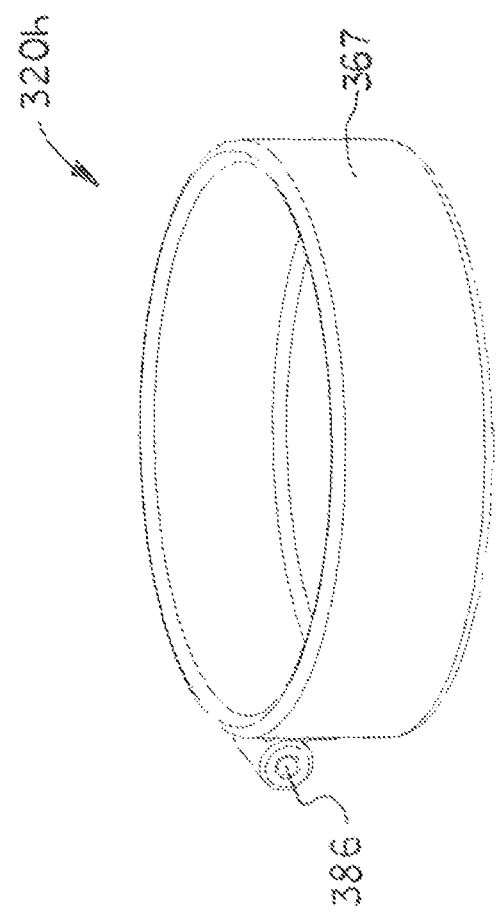
Figure 43:
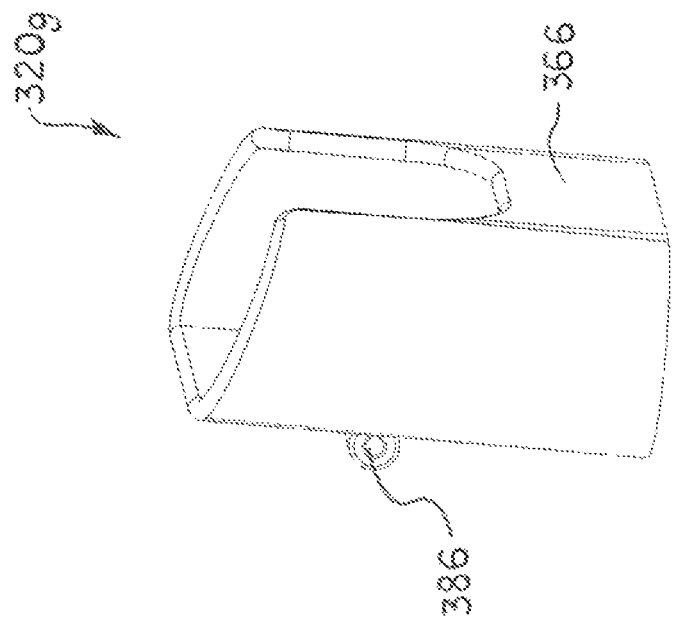
Figure 44:
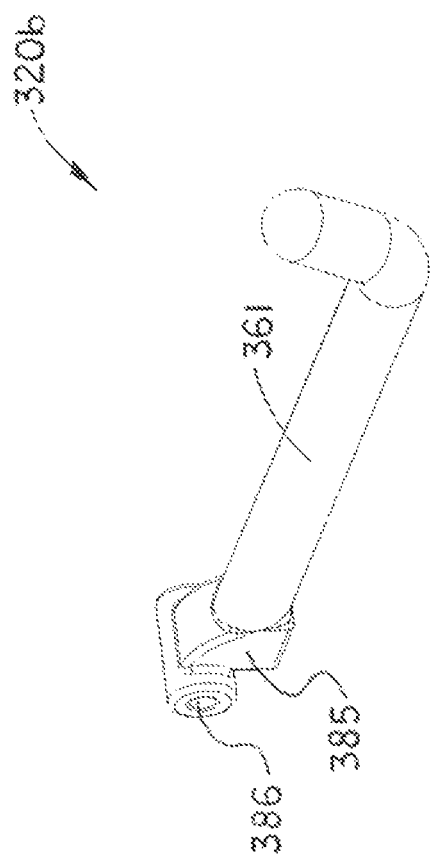
Figure 45:
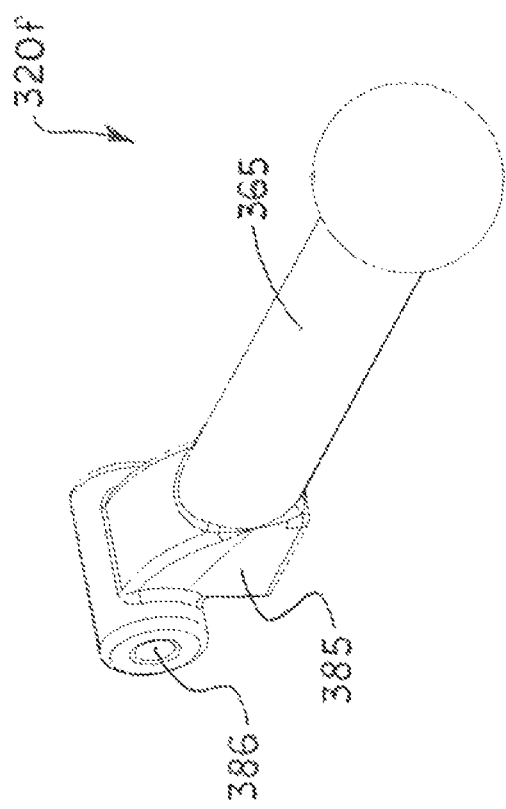
Figure 46:
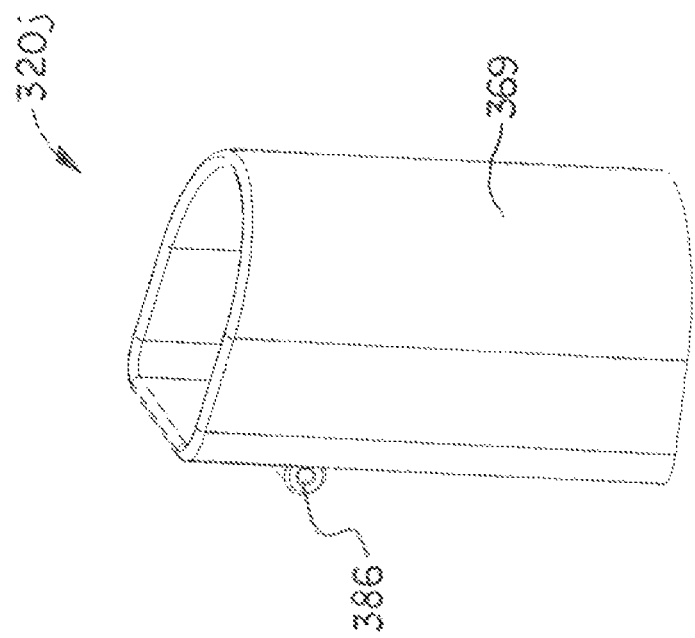
Figure 47:
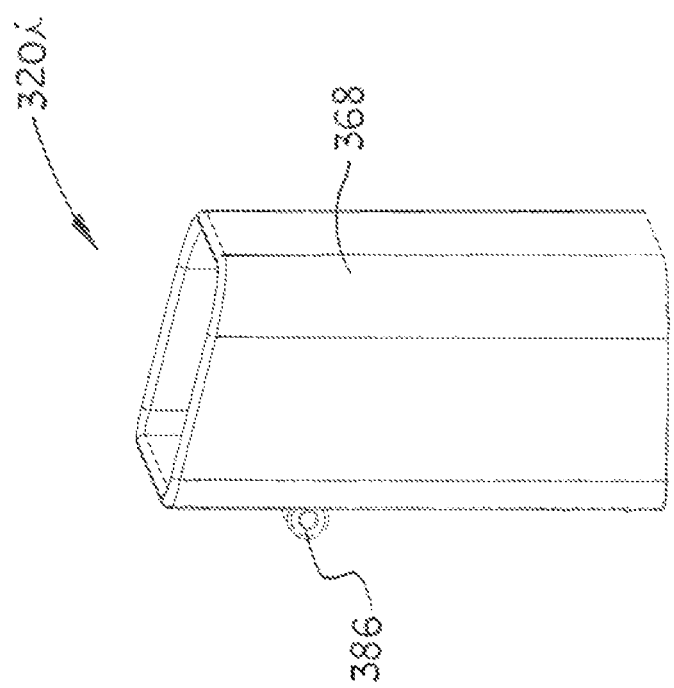
Figure 48:
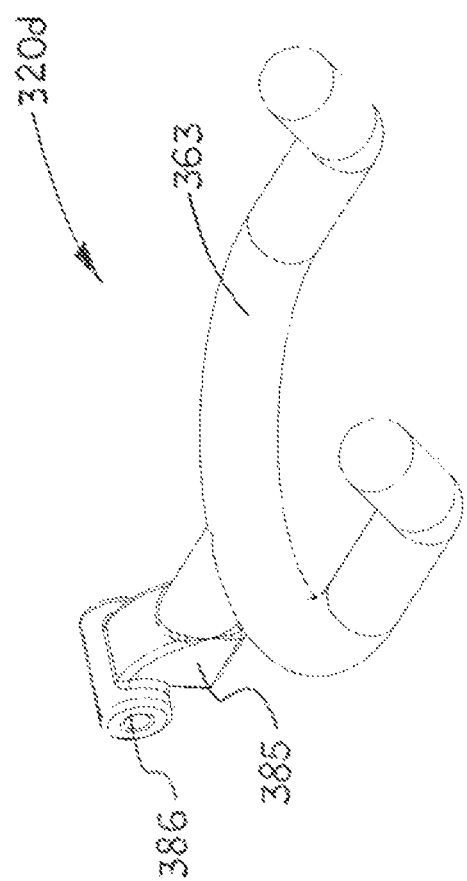

Referring next to FIGS, 23A-53 of the drawings, an alternative illustrative embodiment of the article supporting assemblies is generally indicated by reference numeral 301 in FIGS. 23A and 23B. In the assembly 301, elements which are analogous to the respective elements of the assembly 1 that was heretofore described with respect to FIGS. 1-21 are designated by the same respective numerals in the 301-399 series in FIGS. 23A-53. As illustrated in FIGS. 23A and 23B, at least one article support device 320a-320m may engage at least one mount slot 308 in the assembly base 302 to support at least one article (not illustrated) such as an article of clothing, a cell phone, a cup or the like, for example and without limitation. Each article support device 320a-320n may include a support device base 321 which is adapted to detachably engage the mount slot 308, typically in the same manner which was heretofore described with respect to the support device base 21 in FIGS. 9-15B. Various article support elements 360-374 may extend from each support device base 321. Accordingly, the article support device 320a (FIG. 37) includes a curved hook 360 which may be attached to its corresponding support device base 321 typically in a manner which will be hereinafter described. The article support device 320b (FIG. 44) includes a straight hook 361 which may be attached to its corresponding support device base 321. The article support device 320d (FIG. 48) includes a double hook 363 which may be attached to its corresponding support device base 321. The article support device 320e (FIG. 36) includes a single peg loop 364 which may be attached to its corresponding support device base 321. The article support device 320f (FIG. 45) includes a rounded peg 365 which may be attached to its corresponding support device base 321. The article support device 320g (FIG. 43) includes a cell phone holder 366 which may be attached to its corresponding support device base 321. The article support device 320h (FIG. 42) includes a cup holder 367 which may be attached to its corresponding support device base 321. The article support device 320i (FIG. 47) includes a deep basket 368 which may be attached to its corresponding support device base 321. The article support device 320j (FIG. 46) includes a narrow basket 369 which may be attached to its corresponding support device base 321. The article support device 320l (FIG. 40) includes a peg magnet 370 which may be attached to its corresponding support device base 321. The article support device 320m (FIG. 41) includes a wide loop 371 which may be attached to its corresponding support device base 321. The article support device 320n (FIG. 38) includes a double peg loop 374 which may be attached to its corresponding support device base 321. Another article support device (not illustrated) may include a deep hook 62 (FIG. 1) which may be attached to its corresponding support device base 321. Still another article support device (not illustrated) may include a tray 72 (FIG. 1) which is attached to a pair of support device bases 321. Accordingly, various articles can be supported on the respective article support devices 320a-320n typically in the manner which was heretofore described with respect to the article supporting assembly 1. It will be recognized and understood by those skilled in the art that the article support elements 360-374 illustrated in FIGS. 23A, 23B and 36-48 are non-limiting examples of possible article support elements which may be attached to each corresponding support device base 321 of each article support device 320, and article support elements of alternative design may be attached to the support device bases 321 depending on the types of articles which are to be supported by the article support devices 320.

As illustrated in FIGS. 24-32, in some embodiments, the support device base 321 of each article support device 320 may be generally elongated and oval or elliptical in shape. Accordingly, the support device base 321 may have a pair of curved base sides 322, a generally flat or planar base bottom 323 and base top 324 which extend between the base sides 322, and a generally flat or planar base front 325 and base rear 326. Each article support element 360-374 may be attached to the support device base 321 typically in a manner which will be hereinafter described. In alternative embodiments, the support device base 321 may have a rectangular or other polygonal or non-polygonal shape.

A locking mechanism 328 may be provided on the base rear 326 of the support device base 321. In some embodiments, the locking mechanism 328 may have a design which is the same as or similar to the locking mechanism 28 of the support device base 21 on the assembly 1 heretofore described with respect to FIGS. 3-8. Accordingly, like elements of the locking mechanism 328 are designated by like reference numerals in the 328-336 series to those respective elements of the locking mechanism 28. The locking mechanism 328 of each article supporting assembly 301a-301n may include a locking cam 330 which may be mounted in a mount slot 308 (FIG. 23A) of the assembly base 302 typically in the same manner which was heretofore described with respect to the locking cam 30 of the locking mechanism 28 engaging the mount slot 8 of the assembly base 2 in FIGS. 9-15.

Each article supporting assembly 301a-301n may be attached to its corresponding support device base 321. Accordingly, as illustrated in FIGS. 24, 25, 27, 31 and 32, a device head cavity 380 may be provided in the base front 325 of the support device base 321. The device head cavity 380 may be generally elongated and cylindrical in shape. A device channel 381 may communicate with the device head cavity 380. The device channel 381 may open to the base top 324 of the support device base 321.

Figure 33:
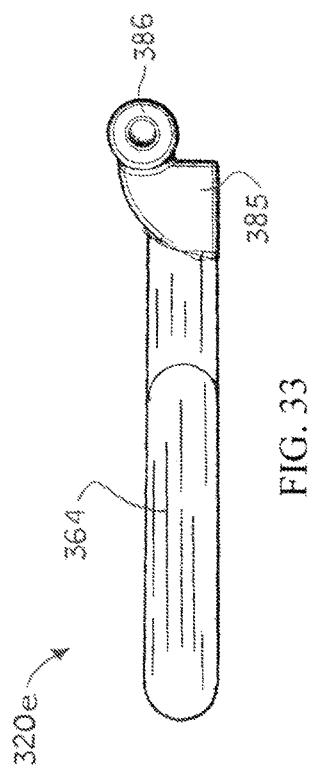
FIG. 33 is a side view of a typical article support device which is suitable for implementation of the article supporting assembly illustrated in FIG. 23.
Figure 31:
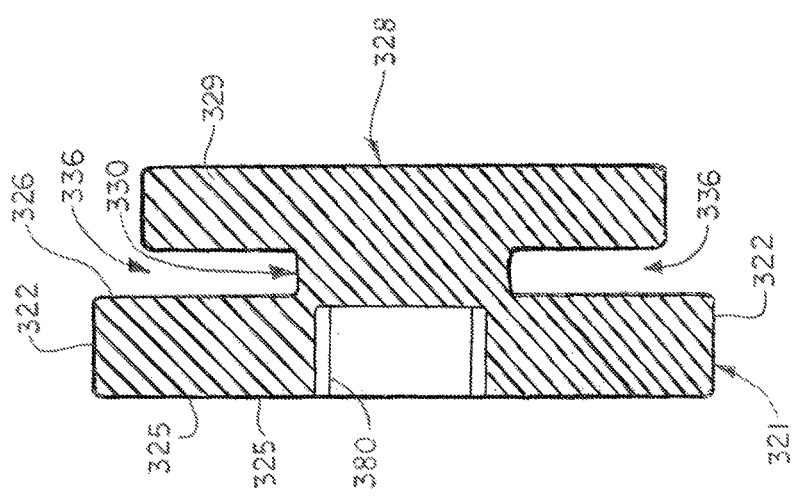
FIG. 31 is a longitudinal sectional view, taken along section lines 31-31 in FIG. 25, of the support device base.

As illustrated in FIG. 33, each article support device 320a-320n may include a device base 385. A device head 386 may be provided on the device base 385. The device head 386 may be generally elongated and cylindrical in shape. Accordingly, as illustrated in FIGS. 34 and 35, the device head 386 may be suitably sized and shaped for insertion into the device head cavity 380 in the support device base 321. Thus, the device head 386 may pivotally mount the article support device 320a-320n to its corresponding support device base 321 such that the article support device 320a-320n can be selectively deployed in the lowered, article-supporting position illustrated in FIG. 34 or the raised, nonfunctional or stowage position illustrated in FIG. 35 as the device head 386 rotates in the device head cavity 380. In the article-supporting position illustrated in FIG. 34, the device base 385 may engage the base front 325 of the support device base 321 such that the article support device 320a-320n is capable of supporting the weight of a device (not illustrated) on the assembly base 2.

Figure 49:
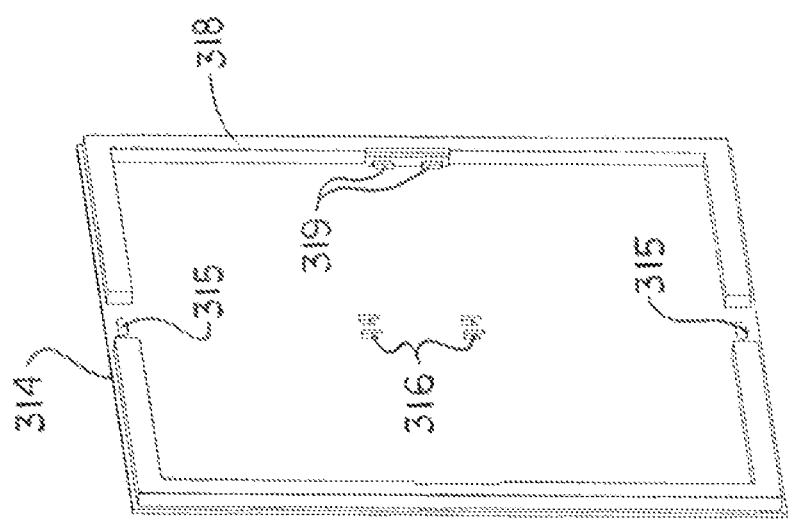
FIG. 49 is a front perspective view of a typical backing plate of the article supporting assembly illustrated in FIG. 23.
Figure 50:
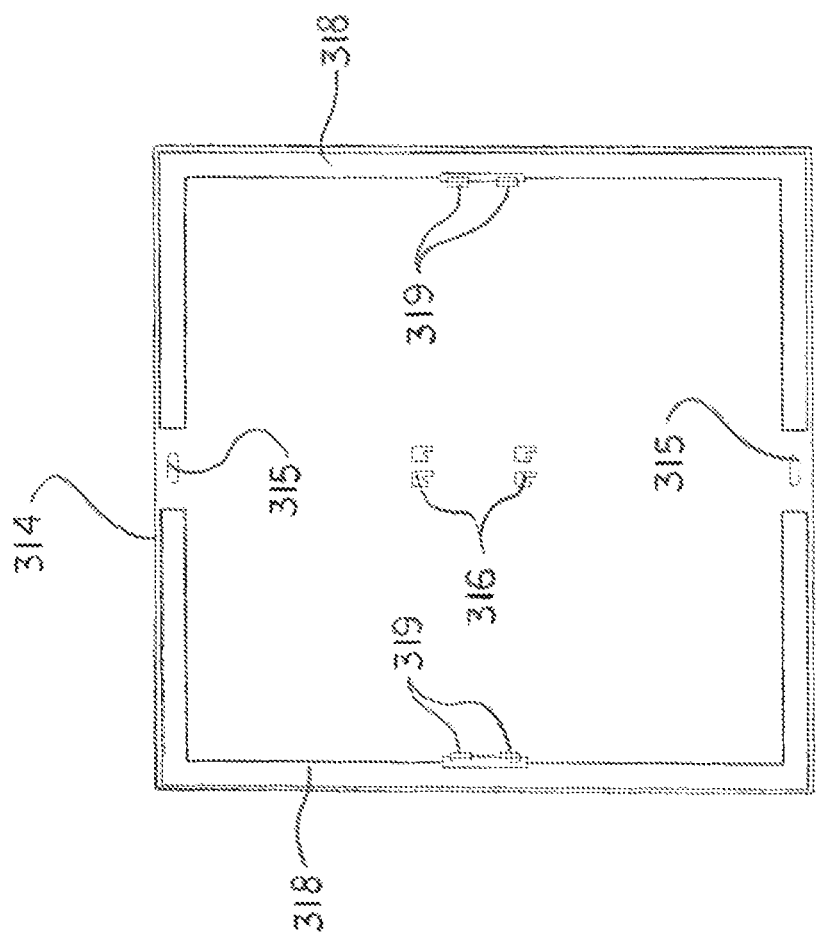
FIG. 50 is a front view of the backing plate illustrated in FIG. 49.
Figure 51:
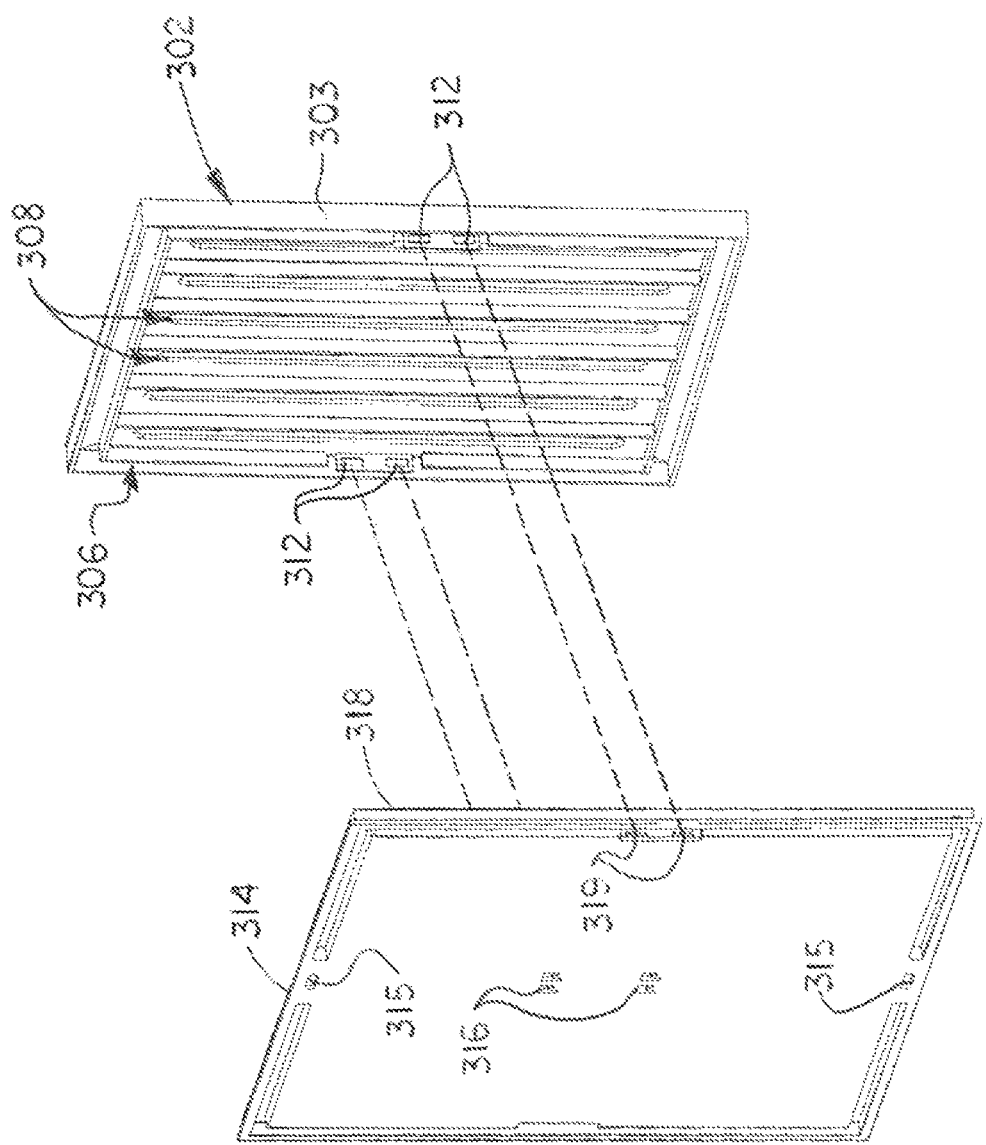
FIG. 51 is a rear exploded perspective view illustrating typical attachment of the assembly base to the backing plate of the article supporting assembly illustrated in FIG. 23.
Figure 53:
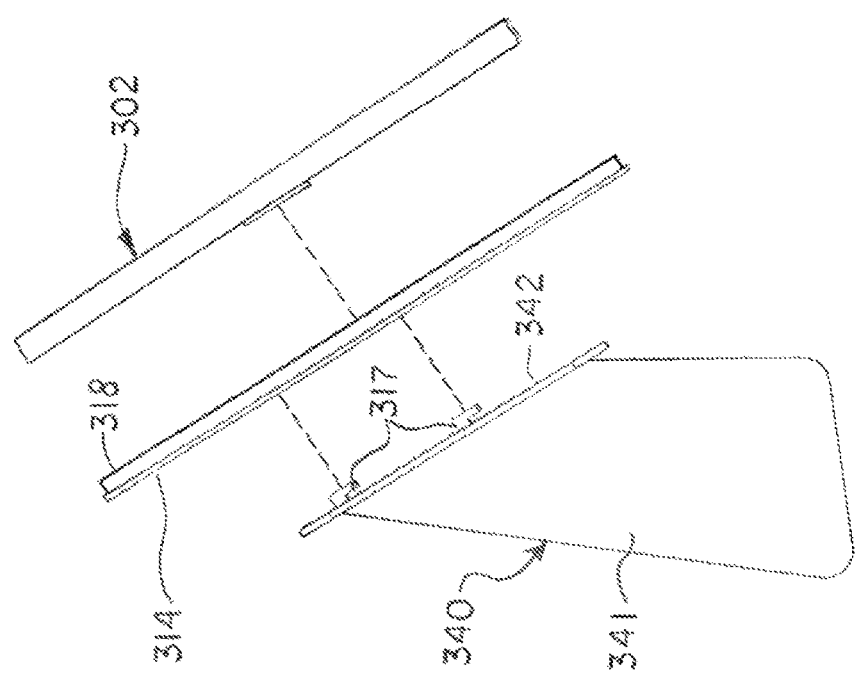
FIG. 53 is an exploded side view illustrating typical attachment of the backing plate to the stand and the assembly base to the backing plate of the article supporting assembly illustrated in FIG. 23.

As illustrated in FIGS. 51 and 53, in some embodiments, the assembly base 302 may be mounted on a backing plate 314. The backing plate 314 may, in turn, be mounted on a stand 340 (FIG. 53). As illustrated in FIGS. 49 and 50, the backing plate 314 may include a protruding back in plate rim 318. A pair of spaced-apart pairs of assembly base mount tabs 319 may extend Front opposite sides of the backing plate 314. As illustrated in FIG. 51, the assembly base 302 may have a rim channel 306. The rim channel 306 may be suitably sized and shaped to accommodate the backing plate rim 318 on the backing plate 314. A pair of spaced-apart pairs of flange slots 312 may be provided in opposite sides of the assembly base 302. Accordingly, the assembly base 302 may be mounted to the backing plate 314 by inserting the backing plate rim 318 on the backing plate 314 in the companion rim channel 306 in the assembly base 302 and simultaneously engaging the assembly base mount tabs 319 on the backing plate 314 with the respective companion flange slots 312 in the assembly base 102. Alternative techniques known by those skilled in the art may be used to mount the assembly base 302 on the backing plate 314.

Figure 52:
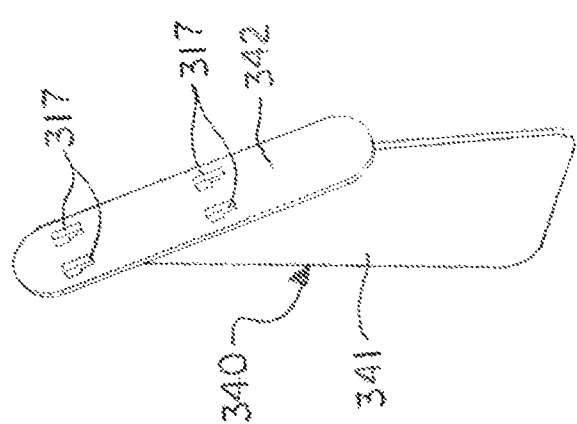
FIG. 52 is a front perspective view of a typical stand of the article supporting assembly illustrated in FIG. 23.

The backing plate 314 may be mounted on the stand plate 342 of the stand 340 according to any suitable technique which is known by those skilled in the art. As illustrated in FIGS. 49-51, in some embodiments, multiple peg openings 316 may extend through a central portion of the backing plate 314. As illustrated in FIG. 52, multiple mount pegs 317 may extend from the stand plate 142. Accordingly, the backing plate 314 can be mounted on the stand plate 342 as the mount pegs 317 are inserted through the respective peg openings 316 in the backing plate 314. Thus, as illustrated in FIGS. 23A and 23B, the stand 340 may be placed on a flat support surface (not illustrated) to support the assembly base 2, and the article support devices 320a-320n thereon, at an angle to the support surface. In other applications, the backing plate 314 may be mounted on a wall or other vertical surface or structure (not illustrated).

Application of the article supporting assemblies 320a-320n may be as was heretofore described with respect to the article supporting assemblies 20a-20m in FIG. 1. Accordingly, each article support device 320a-320n may be mounted to the assembly base 302 by engagement of the support device base 321 with one of the mount slots 308 in the assembly base 302 by rotation of the support device base 321 from the release position to the locked position, typically as was heretofore described with respect to engagement of the support device base 21 with the mount slot 8 in FIGS. 9-15. It will be appreciated by those skilled in the art that the article support device or devices 320a-320n may be selected for attachment to the assembly base 302 according to the type of article support element 360-374 which extends front the support device base 321 of the article support device 320 and the type of article which is to be supported on the assembly base 302. For example and without limitation, articles of clothing such as coats, shirts, caps, hats or the like may be supported on, the curved hook 360 of the article support device 320a, the straight hook 361 of the article support device 320b or the rounded peg 365 of the article support device 320f. An article may be magnetically attached to the peg magnet 370 of the article support device 320l. Various items (not illustrated) such as pens and/or pencils, for example and without limitation, may be placed in the deep basket 368 of the article support device 320i or the narrow basket 369 of the article support device 320j. A cell phone (not illustrated) may be placed in the cell phone holder 366 of the article support device 320g. A beverage-containing cup (not illustrated) may be placed in the cup holder 367 of the article support device 320h. Accordingly, the various articles are securely supported by the respective article support devices 320a-320n on the assembly base 302 for stowage until they are subsequent retrieved and used. After use, the articles can be selectively replaced on the article support devices 320a-320n for continued stowage. It will be appreciated by those skilled in the art that when not in use, the article support devices 320a-320n may be selectively deployed in the raised, nonfunctional and stowage position illustrated in FIG. 35 for space-efficient storage, or transport of the article supporting assembly 301.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An article supporting assembly comprising:
    at least one assembly base including:
        a unitary, substantially planar base panel; and
        at least one elongated. generally vertical mount slot extending through and disposed in-plane with the base panel, the mount slot having a pair of spaced-apart slot edges; and
    at least one article support device detachably carried by the assembly base, the at least one article support device including:
        at least one support device base, the support device base positional between a release position and a locked position within the mount slot;
        a locking mechanism including a locking cam carried by the support device base, the locking cam having a pair of opposite cam lock surfaces engaging the slot edges, respectively, of the mount slot in the locked position of the support device base and disengaging the slot edges, respectively, of the mount slot in the release position of the support device base;
        a device head cavity in the at least one support device base;
        at least one article support element carried by the support device base, the at least one article support element having a device head suitably sized and shaped for insertion into the device head cavity in the at least one support device base such that the device head pivotally mounts the at least one article support element to the at least one support device base and the at least one article support element can be selectively deployed in a lowered, article-supporting position or a raised, nonfunctional or stowage position as the device head rotates in the device head cavity.

2. The article supporting assembly of claim 1 wherein the at least one article support element comprises at least one of a hook, a loop, a cup holder, a cell phone holder, a magnet, a basket and a tray.

3. The article supporting assembly of claim 1 further comprising a backing plate, and wherein the assembly base is carried by the backing plate.

4. The article supporting assembly of claim 1 further comprising a stand, and wherein the assembly base is carried by the stand.

5. The article supporting assembly of claim 4 wherein the stand comprises a stand base and a stand plate carried by the stand base, and wherein the assembly base is carried by the stand plate.

6. The article supporting assembly of claim 1 wherein the support device base is generally elongated and rectangular and has a base bottom, a base top, a pair of base sides, a base front and a base rear, and wherein the locking cam of the locking mechanism is carried by the base rear.

7. The article supporting assembly of claim 6 wherein the locking cam has a top cam surface generally flush with the base top and a bottom cam surface generally flush with the base bottom.

8. The article supporting assembly of claim 1 wherein the assembly base includes an assembly base frame and the base panel is carried by the assembly base frame, and further comprising at least one side peg opening in the assembly base frame.

9. The article supporting assembly of claim 1 wherein the at least one mount slot comprises a plurality of mount slots, the at least one support device base comprises a pair of spaced-apart support device bases and the at least one article support element comprises a tray rotatably carried by the support device bases.

10. An article supporting assembly, comprising:
at least one assembly base including:
a unitary, substantially planar base panel; and
at least one elongated, generally vertical mount slot extending through and disposed in-plane with the base panel, the mount slot having a pair of spaced-apart slot edges; and
at least one article support device detachably carried by the assembly base, the at least one article support device including:
at least one support device base, the support device base positional between a release position and a locked position within the mount slot;
a locking mechanism including a locking cam carried by the support device base, the locking cam having a pair of opposite cam lock surfaces engaging the slot edges, respectively, of the mount slot in the locked position of the support device base and disengaging the slot edges, respectively, of the mount slot in the release position of the support device base; and
a cylindrical device head cavity in the at least one support device base; and
at least one article support element carried by the support device base, the at least one article support element having a device head in the device head cavity of the at least one device support base such that the device head pivotally mounts the at least one article support element to the at least one support device base and the at least one article support element is positional between a lowered, article-supporting position and a raised, nonfunctional, stowage position as the device head rotates in the device head cavity.

11. The article supporting assembly of claim 10 wherein the at least one article support element comprises at least one of a hook, a loop, a cup holder, a cell phone holder, a magnet, a basket and a tray.

12. The article supporting assembly of claim 10 further comprising a hacking plate, and wherein the assembly base is carried by the backing plate.

13. The article supporting assembly of claim 10 further comprising a stand. and wherein the assembly base is carried by the stand.

14. The article supporting assembly of claim 13 wherein the stand comprises a stand base and a stand plate carried by the stand base, and wherein the assembly base is carried by the stand plate.

15. The article supporting assembly of claim 10 wherein the support device base is generally elongated and rectangular and has a base bottom, a base top, a pair of curved base sides, a base front and a base rear, and wherein the locking cam is carried by the base rear.

16. The article supporting assembly of claim 15 wherein the locking cam has a top cam surface generally flush with the base top and a bottom cam surface generally flush with the base bottom.

17. The article supporting assembly of claim 10 wherein the assembly base includes an assembly base frame and the base panel is carried by the assembly base frame, and further comprising at least one side peg opening in the assembly base frame.

18. The article supporting assembly of claim 10 wherein the at least one mount slot comprises a plurality of mount slots, the at least one support device base comprises a pair of spaced-apart support device bases and the at least one article support element comprises a tray rotatably carried by each of the support device bases.

19. A method of mounting an article, comprising:
obtaining an article supporting assembly haying at least one assembly base including a unitary, substantially planar base panel and at least one elongated, generally vertical mount slot having, a pair of spaced-apart slot edges extending through and disposed in-plane with the base panel;
placing a support device base of at least one article support device in the mount slot, the support device base including a cylindrical device head cavity and at least one article support device having a cylindrical device head in the device head cavity of the support device base such that the head pivotally mounts the at least one article support device to the support device base;
facilitating engagement of the support device base with the slot edges of the mount slot by rotating the support device base about 90 degrees from a release position to a locked position in the mount slot; and
supporting at least one article on the article support device.

20. The method of claim 19 wherein supporting at least one article on the article support device comprises supporting the at least one article on at least one of a hook, a loop, a cup holder, a cell phone holder, a magnet, a basket and a tray carried by the support device base.

* * * * *